United States Patent
Nakagawa et al.

(10) Patent No.: US 9,092,720 B2
(45) Date of Patent: Jul. 28, 2015

(54) GENERATING AND USING BLUE NOISE DITHER PATTERNS WITH HIGH VALUE THRESHOLDS POSITIONED FOR A HIGH DOT CONCENTRATION RATIO

(71) Applicant: CANON KABUSHIKI KAISHA, Tokyo (JP)

(72) Inventors: Junichi Nakagawa, Tokyo (JP); Akitoshi Yamada, Yokohama (JP); Nobutaka Miyake, Yokohama (JP); Tomokazu Ishikawa, Yokohama (JP); Shinjiro Hori, Yokohama (JP); Fumitaka Goto, Tokyo (JP); Ryosuke Iguchi, Kawasaki (JP); Hidetsugu Kagawa, Kawasaki (JP); Kouta Murasawa, Yokohama (JP); Hiromitsu Akiba, Yokohama (JP); Senichi Saito, Funabashi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/495,742

(22) Filed: Sep. 24, 2014

(65) Prior Publication Data

US 2015/0092242 A1    Apr. 2, 2015

(30) Foreign Application Priority Data

Oct. 1, 2013    (JP) .................................. 2013-206321

(51) Int. Cl.
*H04N 1/405*    (2006.01)
*G06K 15/02*    (2006.01)
*G06K 15/10*    (2006.01)
*B41J 2/045*    (2006.01)
(Continued)

(52) U.S. Cl.
CPC ......... *G06K 15/1881* (2013.01); *B41J 2/04593* (2013.01); *G06K 15/102* (2013.01); *G06K 15/1878* (2013.01); *G06K 2215/0094* (2013.01); *G06K 2215/101* (2013.01)

(58) Field of Classification Search
None
See application file for complete search history.

(56) References Cited

U.S. PATENT DOCUMENTS 5,521,990 A    5/1996 Ishizawa
5,822,462 A    10/1998 Miyake
(Continued)

FOREIGN PATENT DOCUMENTS

JP    2006-50596    2/2006
JP    4574470    8/2010

OTHER PUBLICATIONS

Robert A. Ulichney, "Dithering with Blue Noise", Proceedings of the IEEE, vol. 76, No. 1, Jan. 1988, pp. 56-79.*

(Continued)

*Primary Examiner* — Scott A Rogers
(74) *Attorney, Agent, or Firm* — Fitzpatrick, Cella, Harper & Scinto

(57) ABSTRACT

Provided is a dither pattern generation method so that a dot arrangement having excellent dispersibility can be obtained in low-gradation areas for single colors and for mixed colors. The dither pattern generation method generates dot patterns for low-gradation areas having threshold values 1 to S so that high dispersibility is obtained in a cyan dot pattern and a magenta dot pattern, and so that in a combined dot pattern made by combining these dot patterns there are no overlapping pixels. The dither pattern generation method then sets threshold values for a cyan dither pattern and a magenta dither pattern based on these generated dot patterns.

12 Claims, 24 Drawing Sheets

(51) Int. Cl.
*H04N 1/409* (2006.01)
*H04N 1/52* (2006.01)
*H04N 1/58* (2006.01)

(56) References Cited

U.S. PATENT DOCUMENTS

| | | | |
|---|---|---|---|
| 5,864,638 A | 1/1999 | Ishizawa | |
| 6,394,612 B1 * | 5/2002 | Yano | 358/3.13 |
| 6,546,145 B1 | 4/2003 | Miyake | |
| 6,750,983 B1 | 6/2004 | Miyake | |
| 6,804,419 B1 | 10/2004 | Miyake | |
| 6,824,240 B2 | 11/2004 | Kusakabe | |
| 6,954,542 B2 | 10/2005 | Miyake | |
| 7,099,046 B2 | 8/2006 | Yamada | |
| 7,312,901 B2 | 12/2007 | Yamada | |
| 7,548,346 B2 | 6/2009 | Yamada | |
| 7,672,011 B2 | 3/2010 | Kato | |
| 7,751,088 B2 * | 7/2010 | Yamazaki et al. | 358/3.14 |
| 7,855,809 B2 | 12/2010 | Kato | |
| 7,859,723 B2 | 12/2010 | Yamada | |
| 7,889,389 B2 * | 2/2011 | Kakutani | 358/3.13 |
| 7,920,294 B2 | 4/2011 | Marumoto | |
| 7,924,464 B2 * | 4/2011 | Kakutani | 358/3.16 |
| 7,957,031 B2 * | 6/2011 | Kakutani | 358/3.16 |
| 7,961,350 B2 * | 6/2011 | Kakutani | 358/3.13 |
| 7,965,418 B2 | 6/2011 | Yamada | |
| 7,965,419 B2 * | 6/2011 | Kakutani | 358/3.13 |
| 8,208,176 B2 * | 6/2012 | Takahashi et al. | 358/3.13 |
| 8,405,876 B2 * | 3/2013 | Nakatani et al. | 358/3.06 |
| 8,503,031 B2 | 8/2013 | Kajihara | |
| 8,619,319 B2 | 12/2013 | Tsuchiya | |
| 8,724,164 B2 * | 5/2014 | Kakutani | 358/1.9 |
| 8,830,530 B2 | 9/2014 | Sano | |
| 2007/0216954 A1 * | 9/2007 | Kakutani | 358/3.06 |

OTHER PUBLICATIONS

U.S. Appl. No. 14/495,736, filed Sep. 24, 2014.
U.S. Appl. No. 14/495,740, filed Sep. 24, 2014.

* cited by examiner

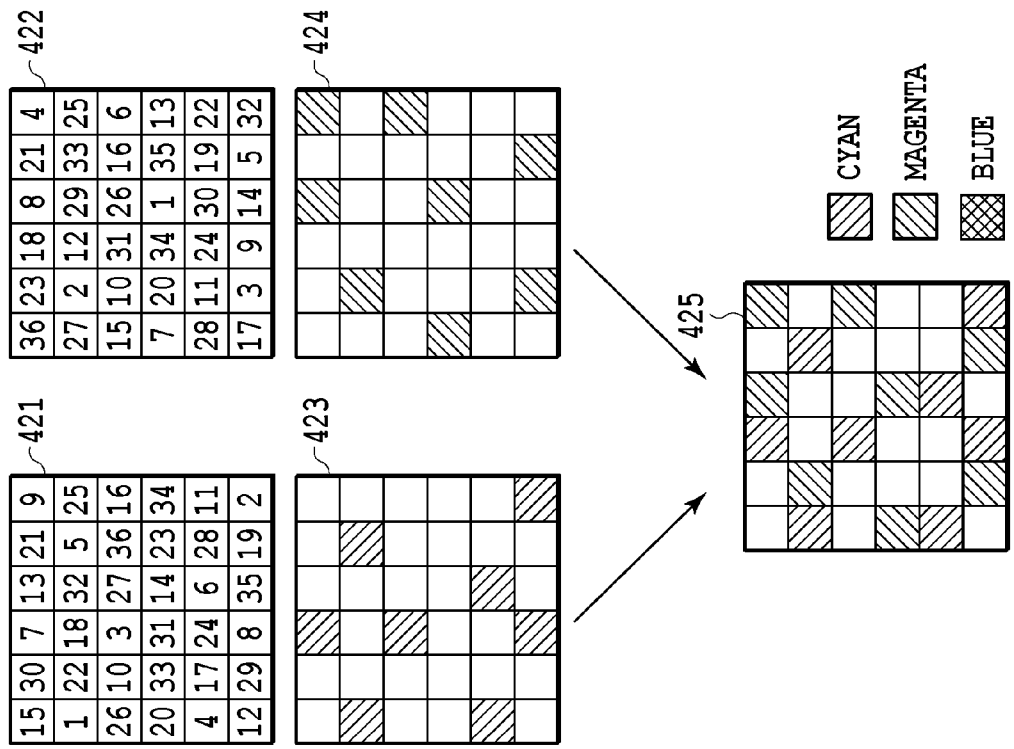
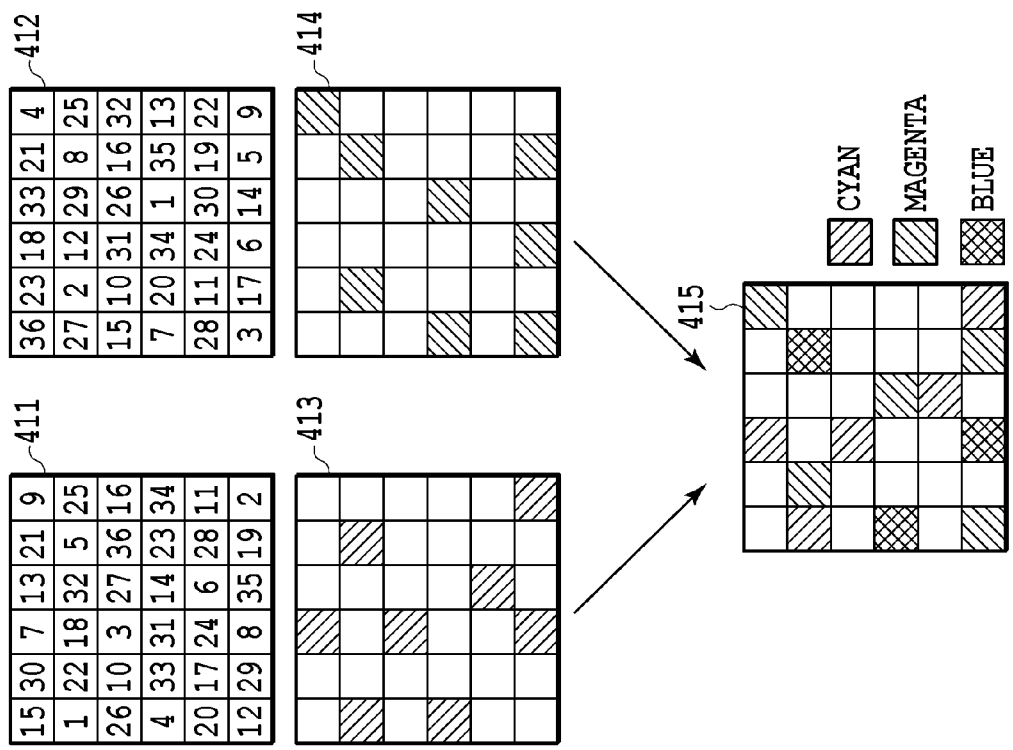

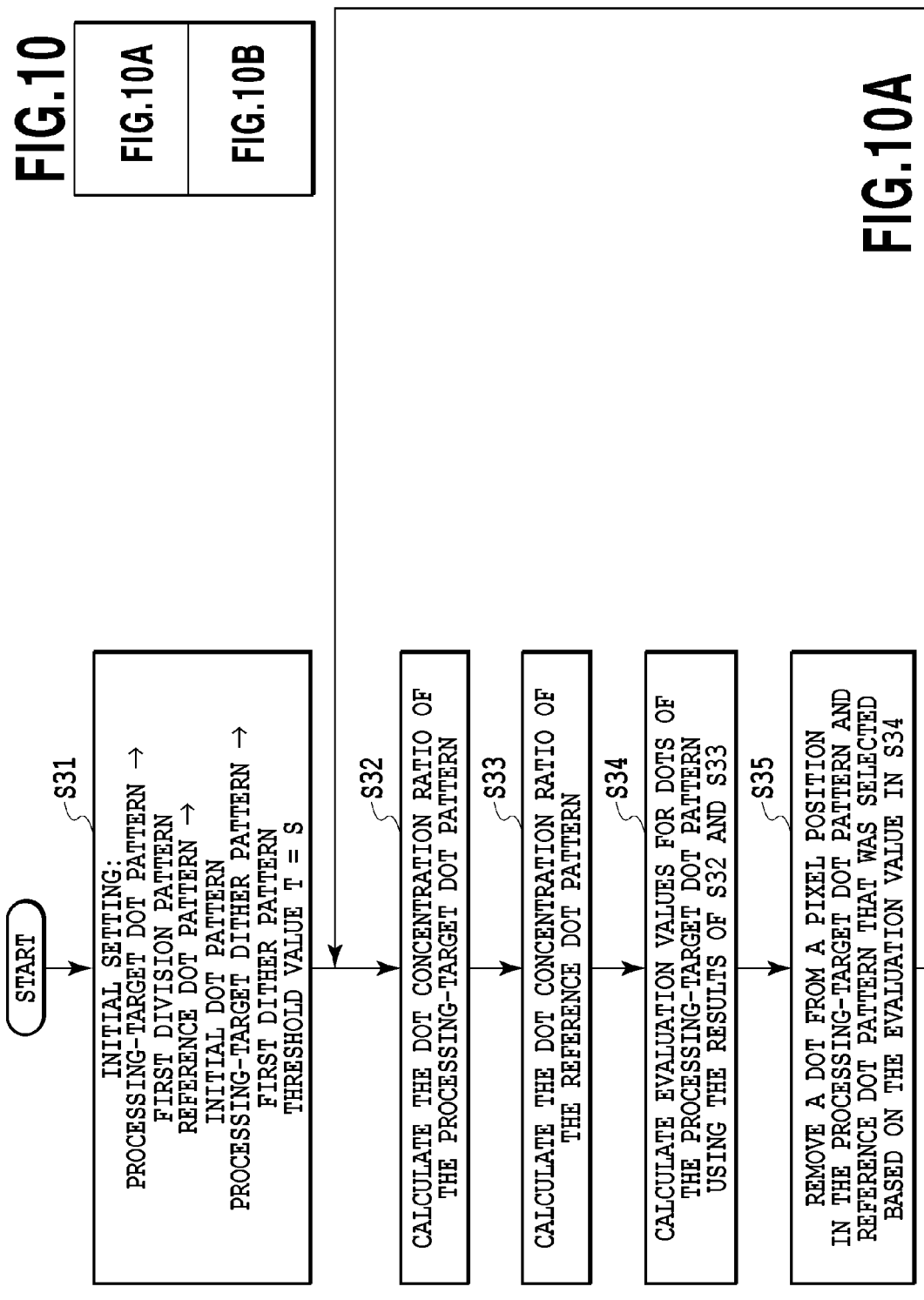

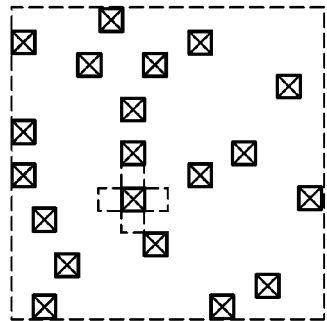
PROCESSING-TARGET DOT PATTERN
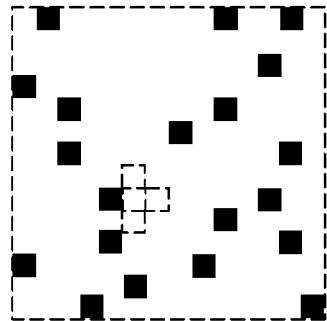
REFERENCE DOT PATTERN
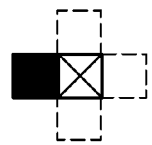
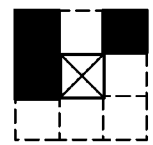
| ABOVE | 0 |
|---|---|
| BELOW | 0 |
| LEFT | 1 |
| RIGHT | 0 |
| SAME | 0 |
TABLE 1
| ABOVE 1 | 0 |
|---|---|
| ABOVE 2 | 0 |
| BELOW 1 | 0 |
| BELOW 2 | 1 |
| SAME | 0 |
TABLE 2
| ABOVE RIGHT | 2 | BELOW | 0 |
|---|---|---|---|
| ABOVE | 0 | BELOW RIGHT | 0 |
| ABOVE LEFT | 1 | RIGHT | 0 |
| LEFT | 1 | SAME | 0 |
| BELOW LEFT | 0 | | |
TABLE 3
FIG.14

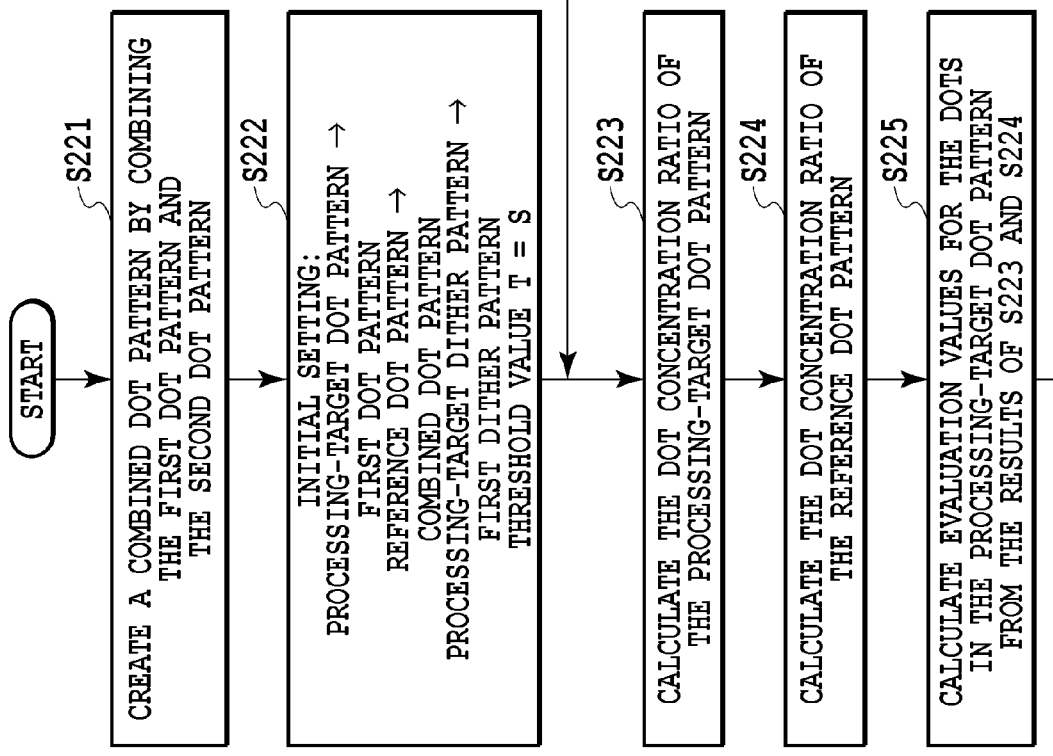

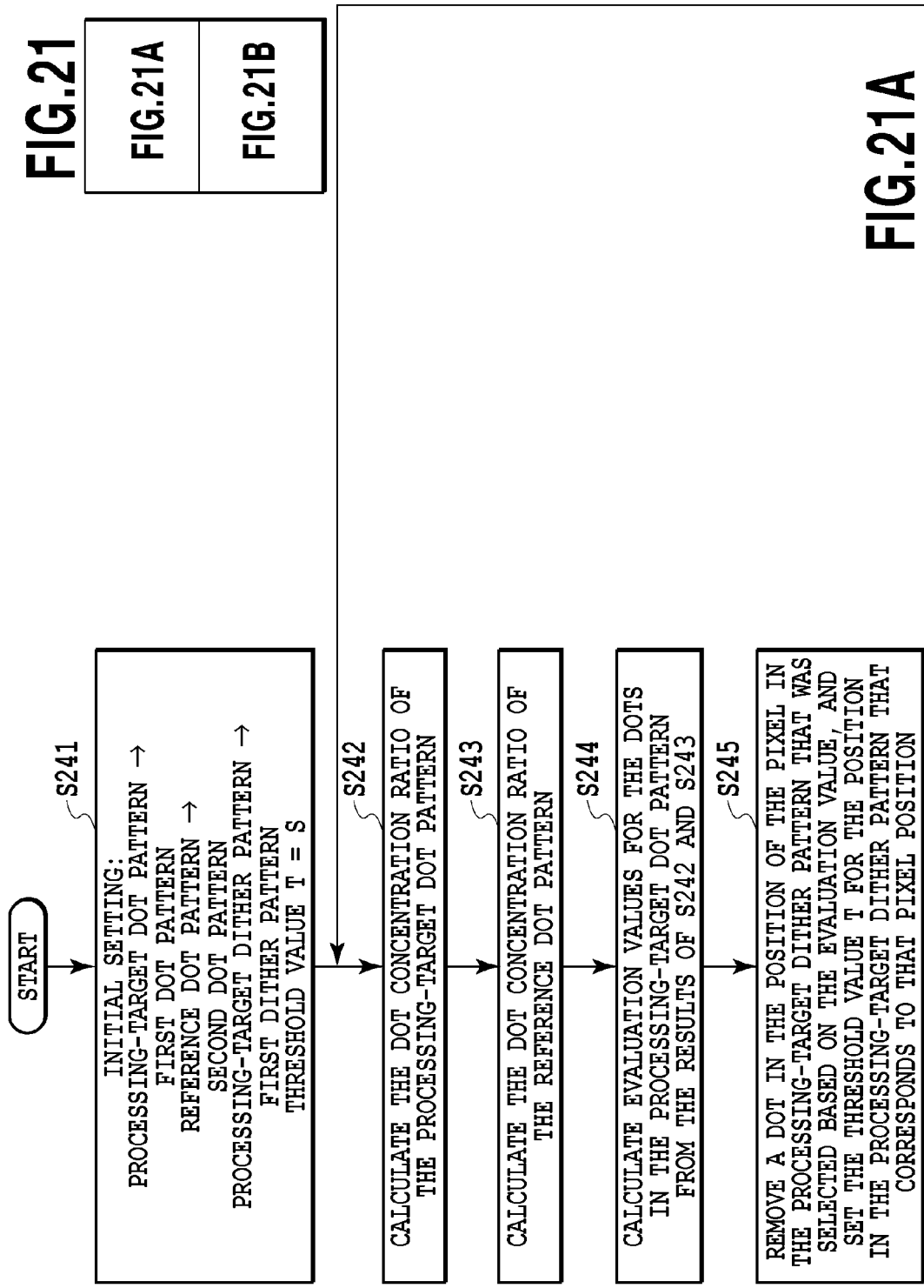

GENERATING AND USING BLUE NOISE DITHER PATTERNS WITH HIGH VALUE THRESHOLDS POSITIONED FOR A HIGH DOT CONCENTRATION RATIO

BACKGROUND OF THE INVENTION

1. Field of the Invention

The present invention relates to pseudo halftone processing for representing a multi-gradation image in two gradations. Particularly, the present invention relates to a dither pattern generation method that is used when executing a quantization process by a dithering method.

2. Description of the Related Art

In pseudo halftone processing that represents a multi-gradation image in two gradations: (1) dot printing and (0) no dot printing, performing quantization processing is desired in order to convert multi-value density data to two values. As typical quantization processing methods there is the error diffusion method or the dither method, however, from the aspect of being able to achieve quantization at high speed with a small processing load, the dither method is particularly used in high-speed printers for which speed is required, or in multi-color printers for which there is much data.

The dot arrangement on a printing medium is determined according to this kind of quantization processing, and particularly in low-gradation areas from highlighted areas, high dispersibility is required in order to suppress a visual granular feeling. Therefore, in both the error diffusion method and dither method, various methods for increasing dispersibility of dots in low-gradation areas have been proposed. However, even though quantization processing having this kind of high dispersibility may be employed, there may be times, such as when printing a color image, in which the granular feeling becomes worse due to overlapping of plural dots on the surface of the paper. For example, when absolutely the same quantization processing is employed for each color, dots of all colors are printed in the same locations, and the granular feeling increases. Moreover, in cases in which quantization processing is performed for each color independently and with no correlation, there is a possibility that as a result of overlapping there will be dot sparseness and denseness of dots and that dispersibility will be lost even though there is excellent dispersibility for each individual color.

In regards to such problems, Japanese Patent No. 4574470 discloses a method for generating dither patterns so that dispersibility that results from superimposing dot arrangements of plural colors will become a maximum. By using the dither patterns disclosed in Japanese Patent No. 4574470, it is possible to output an image having high dispersibility and in which a granular feeling has been suppressed, and at the same time avoid beading (clumping together of dots) even for low-gradation areas of a color image.

However, in Japanese Patent No. 4574470, the dispersibility that results from superimposing the dot arrangements for plural colors is taken into consideration when setting the dither patterns for each color, so in the case of printing with only one color, when compared to a conventional dither pattern that is generated taking into consideration only one color, there were cases in which dispersibility decreased. In other words, conventionally, it was difficult to generate a dither pattern that could achieve high dispersibility for both the case of a single color and the case of mixed colors.

SUMMARY OF THE INVENTION

The present invention was invented in order to solve the problem described above. Therefore, the object of the present invention is to provide a method for generating dither patterns capable of obtaining dot arrangements having excellent dispersibility even for both the case of a single color and the case of mixed colors.

In a first aspect of the present invention, there is provided a dither pattern generation method for generating plural dither patterns that include a first dither pattern and a second dither pattern in which threshold values 1 to MAX are arranged, comprising: an initial dot pattern generation process of generating an initial dot pattern in which 2×S×N (S and N are integers that satisfy 1≤S<MAX, and 1≤N) dots are arranged in a specified dither pattern area so as to have a blue noise characteristic; a distributing process of distributing the 2×S×N dots that are arranged in the initial dot pattern into a first dot pattern and a second dot pattern so that the first dot pattern and the second dot pattern both have a blue noise characteristic; a process of generating the first dither pattern by setting each of threshold values 1 to S for every N pixels that are correlated with the first dot pattern so that threshold values having a high value are set for positions having a high dot concentration ratio in the initial dot pattern and the first dot pattern; and a process of generating the second dither pattern by setting each of threshold values 1 to S for every N pixels that are correlated with the second dot pattern so that threshold values having a high value are set for positions having a high dot concentration ratio in the initial dot pattern and the second dot pattern.

In a second aspect of the present invention, there is provided a dither pattern generation method for generating plural dither patterns that include a first dither pattern and a second dither pattern in which threshold values 1 to MAX are arranged, comprising: a first dot pattern generation process of generating a first dot pattern in which S×N (S and N are integers that satisfy 1≤S<MAX, and 1≤N) dots are arranged in a specified dither pattern area so as to have a blue noise characteristic; a second dot pattern generation process of generating a second dot pattern so that a dot pattern that combines the first dot pattern and the second dot pattern and the second dot pattern each have a blue noise characteristic; a process of generating the combined dot pattern that combines the first dot pattern and the second dot pattern; a first threshold value setting process of setting threshold values for the first dither pattern by setting each of threshold values 1 to S for every N pixels that are correlated with the first dot pattern so that threshold values having a high value are set for positions having a high dot concentration ratio in the combined dot pattern and the first dot pattern; and a second threshold value setting process of setting threshold values for the second dither pattern by setting each of threshold values 1 to S for every N pixels that are correlated with the second dot pattern so that threshold values having a high value are set for positions having a high dot concentration ratio in the combined dot pattern and the second dot pattern.

In a third aspect of the present invention, there is provided a dither pattern generation method for generating plural dither patterns that include a first dither pattern and a second dither pattern in which threshold values 1 to MAX are arranged, comprising: a first dot pattern generation process of generating a first dot pattern in which S×N (S and N are integers that satisfy 1≤S<MAX, and 1≤N) dots are arranged in a specified dither pattern area so as to have a blue noise characteristic; a second dot pattern generation process of generating a second dot pattern in which S×N (S and N are integers that satisfy 1≤S<MAX, and 1≤N) dots are arranged in a specified dither pattern area so as to have a blue noise characteristic, and so that a combination with the first dot pattern has a blue noise characteristic; a first threshold value setting process of setting threshold values for the first dither pattern by setting each of threshold values 1 to S for every N pixels that are correlated with the first dot pattern so that threshold values having a high value are set for positions having a high dot concentration ratio in the first dot pattern and the second dot pattern; and a second threshold value setting process of setting threshold values for the second dither pattern by setting each of threshold values 1 to S for every N pixels that are correlated with the second dot pattern so that threshold values having a high value are set for positions having a high dot concentration ratio in the first dot pattern and the second dot pattern.

Further features of the present invention will become apparent from the following description of exemplary embodiments (with reference to the attached drawings).

BRIEF DESCRIPTION OF THE DRAWINGS

FIGS. 4A and 4B are schematic diagrams for explaining dither patterns and the result of quantization;

FIG. 10 is a diagram showing the relationship of FIGS. 10A and 10B;

FIG. 10A is a flowchart for explaining a process for setting threshold values;

FIG. 14 is a drawing for explaining a method for acquiring a histogram;

FIG. 20 is a diagram showing the relationship of FIGS. 20A and 20B;

FIG. 20A is a flowchart for explaining a process for setting threshold values in a second embodiment of the present invention;

FIG. 21 is a diagram showing the relationship of FIGS. 21A and 21B;

FIG. 21A is a flowchart for explaining a process for setting threshold values in a third embodiment of the present invention.

DESCRIPTION OF THE EMBODIMENTS

In the following, embodiments of the present invention will be explained in detail with reference to the accompanying drawings.

First Embodiment

Figure 1:
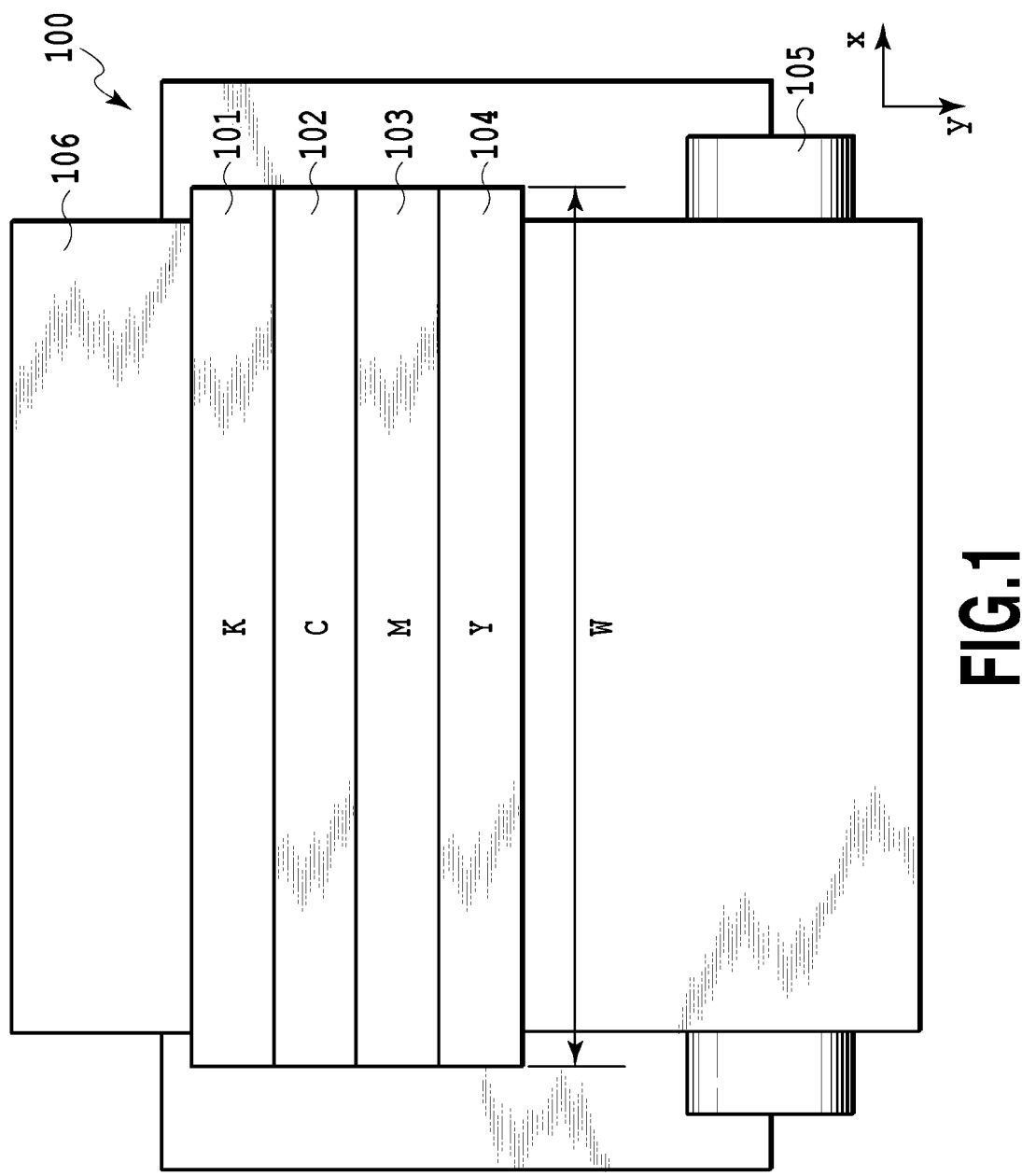
FIG. 1 is a top view of a full-line inkjet printing apparatus that can be applied to embodiments of the present invention.

FIG. 1 is a top view of the printing section of a full-line inkjet printing apparatus (image formation apparatus) that can be applied to the present embodiment. In the inkjet printing apparatus 100, printing heads 101 to 104 are provided in a frame in a fixed manner as illustrated in FIG. 1. The printing heads 101 to 104 have printing elements that eject black (K), cyan (C), magenta (M) and yellow (Y) ink (printing material), respectively, and these printing elements are arranged in plural rows at a fixed pitch and extend in the X direction of FIG. 1 an amount that corresponds to the width W of the printing medium 106. The printing medium 106 is conveyed at a constant speed in the Y direction by the rotation of a conveying roller 105 that has a motor (not illustrated in FIG. 1) as a driving source. In this conveying process, a specified image is printed on the printing medium 106 by ink being ejected from the individual printing elements according to printing data.

Figure 2:
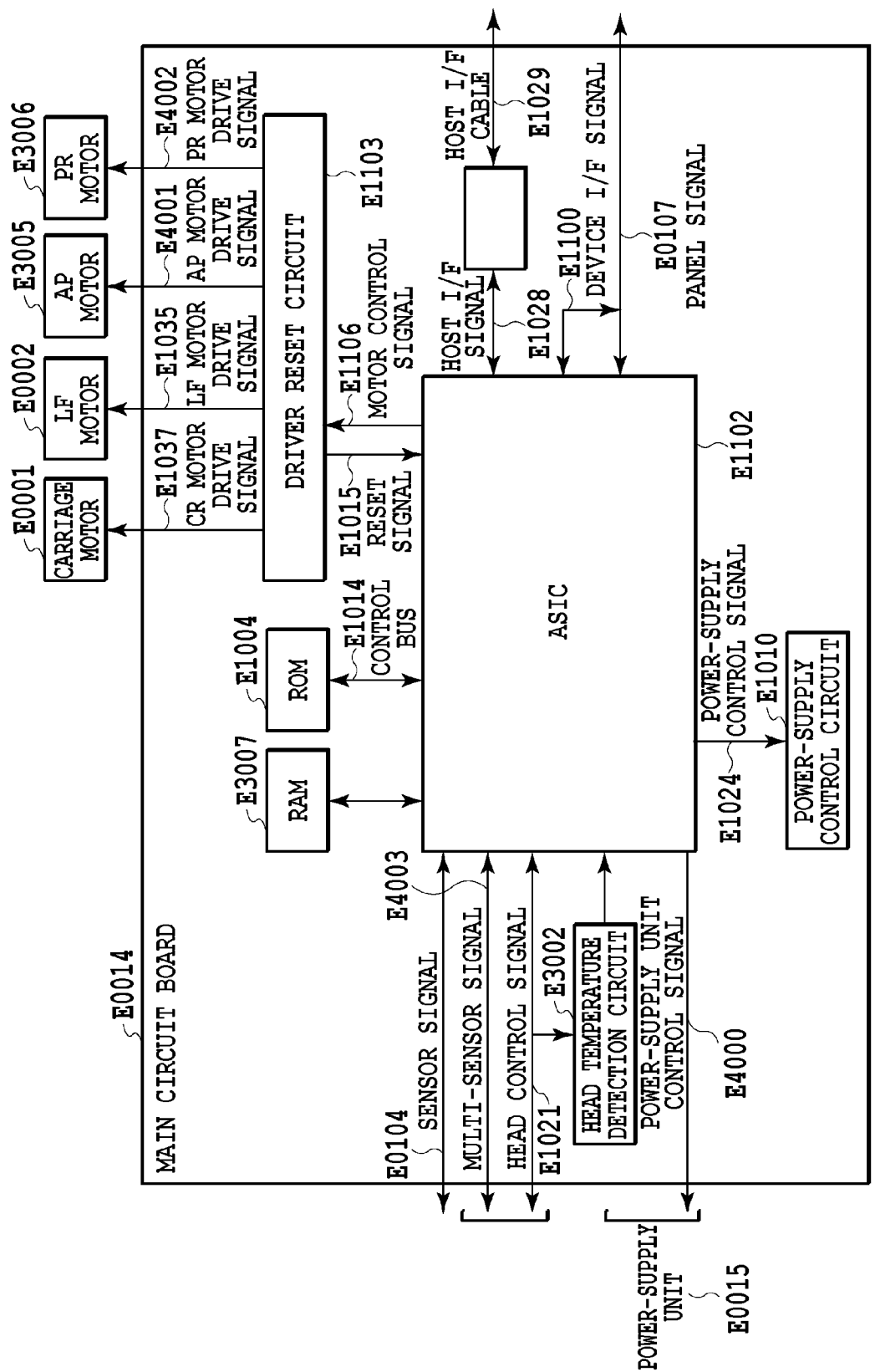
FIG. 2 is a block diagram illustrating the internal construction of a printer engine.

FIG. 2 is a block diagram illustrating the internal construction of a printer engine of this embodiment. An ASIC E1102 that will be the engine of the image formation apparatus is provided on a main circuit board E0014, and this ASIC E1102 reads a program that is stored in a ROM E1004 by way of a control bus E1014, and performs overall control of the apparatus according to that program. When doing this, a DRAM E3007 is used as a data buffer for printing, a received data buffer for the ASIC E1102 or host I/F signals E1028, or used as a work area required for various control operations.

For example, the ASIC E1102 transmits and receives sensor signals E0104 and multi-sensor signals E4003 to/from various sensors and multi-sensors. Moreover, the ASIC E1102 detects panel signals E0107 that are output from a power key, resume key or the like on an externally mounted panel. Furthermore, according to the data input state from the host I/F E0017, the ASIC E1102 performs various logical operations and conditional judgments, controls all of the components, and performs control for driving the inkjet printing apparatus.

A driver-reset circuit E1103 drives various motors according to motor-control signals E1106 from the engine ASIC E1102. More specifically, the driver-reset circuit E1103 generates an LF motor drive signal E1035, and drives an LF motor E0002 for rotating the conveying roller 105. Furthermore, the driver-reset circuit E1103 generates an AP motor drive signal E4001, and drives an AP motor E3005 for performing suction-based recovery of the printing heads. Furthermore, the driver-reset circuit E1103 generates a PR motor drive signal E4002, and drives a PR motor E3006. The driver-reset circuit E1103 of this embodiment has a power-supply circuit, and supplies the necessary power to the main circuit board E0014, a front panel that is located on the outside of the apparatus, and the like. Furthermore, the driver-reset circuit E1103 detects when the power-supply voltage drops, and generates a reset signal E1015 to perform initialization.

A power-supply control circuit E1010 controls the power that is supplied to sensors having light-emitting elements according to a power-control signal E1024 from the ASIC E1102.

The host I/F E0017 transmits host I/F signals E1028 from the ASIC E1102 to a host I/F cable E1029 that is externally connected, and transmits signals from the host I/F cable E1029 to the ASIC E1102.

The necessary electric power is supplied from a power-supply unit E0015, and the supplied electric power undergoes voltage transformation as needed and is then supplied to each of the parts inside and outside the main circuit board E0014. The ASIC E1102 is connected to the power-supply unit E0015, and controls the low power-consumption mode and the like of the main apparatus by way of power-supply unit control signals E4000.

When performing a printing operation, the ASIC E1102 generates a timing signal to interface with the printing heads 101 to 104 using head control signals E1021, and controls the ejection operation. Head control signals E1021 are supplied to the printing heads 101 to 104 by way of a head-drive-voltage-modulation circuit and head connectors (not illustrated in the figure). On the other hand, various information from the printing heads 101 to 104 is also transmitted to the ASIC E1102. Of this information, temperature information about the printing heads 101 to 104 undergoes signal amplification by a head-temperature-detection circuit E3002 on the main circuit board E0014, after which the signal is inputted to the ASIC E1102 and used for various control judgments.

Figure 3:
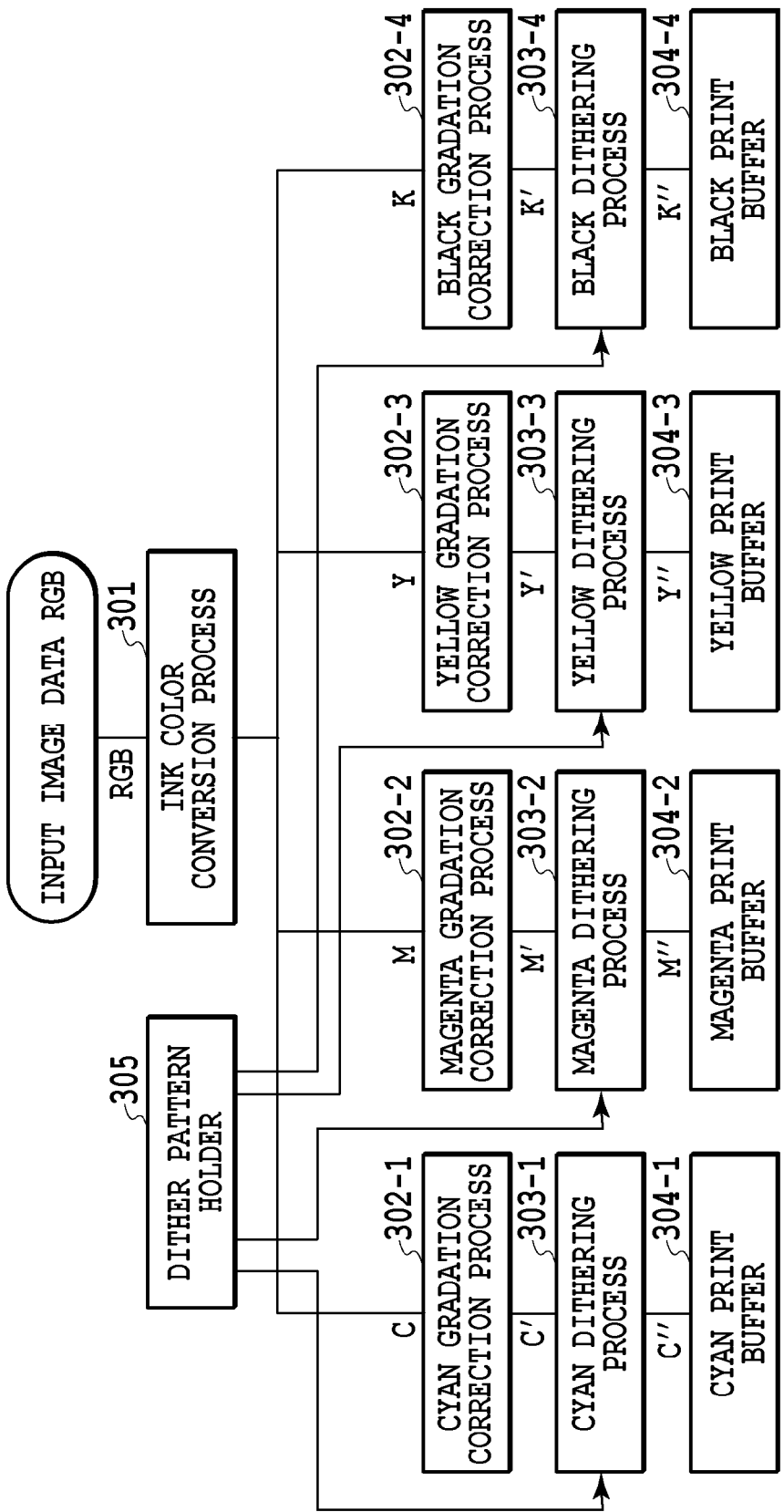
FIG. 3 is a block diagram of the main parts for explaining the image processing of the present invention.

FIG. 3 is a block diagram of the main parts for explaining the image processing that is executed by the ASIC E1102 in this embodiment. Input image data that is received by way of the host I/F cable E1029 is multi-value (8-bit, 256-gradation) RGB data, and by an ink separation process 301, is converted to multi-value (8-bit, 256-gradation) image data CMYK that corresponds to ink that will be used by the printing apparatus.

Gradation correction processes 302-1 to 302-4 that are respectively prepared for the ink cyan, magenta, yellow and black similarly convert the multi-value (8-bit, 256-gradation) gradation data CMYK to multi-value (8-bit, 256-gradation) gradation data C'M'Y'K'. Typically, the number of dots that are printed on a printing medium, and the optical density that is expressed on the printing medium by that number of dots are not linearly related. Therefore, the gradation correction process 302-1 to 302-4 adjust the number of dots to be printed on the printing medium by performing linear conversion of the multi-value color signal data CMYK in order to make this relationship linear. More specifically, the CMYK data is converted to C'M'Y'K' by referencing a 1-dimensional lookup table that is prepared to correspond to each of the ink colors.

Corresponding dither processes 303-1 to 303-4 are performed for the image data C'M'Y'K' after gradation correction, and binary image data C"M"Y"K" is generated. In this embodiment, a dithering method is used as the quantization process, and dither patterns for which threshold values are set for each pixel in advance are held in the dither processes 303-1 to 303-4. The image data C'M'Y'K' for each pixel is compared with the corresponding threshold value in the dither patterns, and converted to print "1" or no print "0". The dither process 303-1 to 303-4 each holds a different dither pattern. The binary data C"M"Y"K" after quantization is temporarily stored in print buffers 304-1 to 304-4 for each color, and printed by the corresponding printing heads 101 to 104.

FIGS. 4A and 4B are schematic diagrams for comparing and explaining the features of the dither patterns and quantization used in this embodiment with the conventional. Here, for simplification, an example is illustrated in which dither patterns having a 6-pixel×6-pixel area are used, and quantization is performed for cyan data C' and magenta data M'.

FIG. 4A is a diagram illustrating quantization processing in the case of using typical conventional dither patterns. The cyan data C' is quantized according to a dither pattern 411, and the magenta data M' is quantized according to a dither pattern 412. In both of the patterns, each of the individual squares indicates one pixel, and the number in the center indicates the threshold value that is assigned to that pixel. When the values of the multi-value data C' and M' that correspond to a respective pixel are equal to greater than or equal to the threshold values, the quantized values C" and M" of that pixel become "1" (a dot is printed), and when the values are less than the threshold values, the quantized values Cv and M" of that pixel become "0" (no dot is printed).

In the figures, an example is illustrated in which multi-value data "8" is uniformly inputted for all pixels. In the cyan quantization result 413 and in the magenta quantization result 414, only pixels having a threshold value that is equal to or less than "8" in the dither patterns 411, 412 are indicated by diagonal lines as print pixels. Here, by superimposing the cyan quantization result 413 and the magenta quantization result 414, a combined pattern 415 is obtained on the paper surface. In the combined pattern 415, pixels that are indicated by diagonal lines are pixels for which either a cyan or magenta dot is printed, and pixels that are indicated by checks are pixels for which both cyan and magenta dots are overlapped and printed.

Typical conventional dither patterns such as the dither patterns 411 and 412 are generated by placing importance on the dispersibility of dots of each color. Therefore, the dispersibility of the cyan quantization result 413 and magenta quantization result 414 is high, however, in the superimposed combined pattern 415, dispersibility is not taken into consideration, so when compared to that of a single color, the dispersibility is reduced, and overlapping pixels appear in some places. In these kinds of overlapping pixels, both cyan and magenta overlap so a blue dot is formed, however, the difference in brightness between the blue dots and blank areas is large, which brings about a worse granular feeling.

On the other hand, FIG. 4B is a drawing illustrating the quantization processing in the case of using the dither patterns of this embodiment. Cyan data C' is quantized according to a dither pattern 421, and the cyan quantization result 423 is obtained. Moreover, magenta data M' is quantized according to a dither pattern 422, and the magenta quantization result 424 is obtained. Here as well, an example is illustrated in which multi-value data "8" is uniformly inputted for all of the pixels, and only pixels having a threshold value that is equal to or less than "8" are indicated with diagonal lines as print pixels. By superimposing the cyan quantization results 423 and the magenta quantization results 424, a CM dot arrangement pattern 425 is obtained.

In this embodiment, the dither patterns 421 and 422 are generated with importance placed on dispersibility of dots when cyan and magenta are superimposed and printed. Therefore, the combined pattern 425 obtained by superimposing the cyan quantization results 423 and magenta quantization results 424 has high dispersibility when compared with the combined pattern 415 in the conventional example, and overlapping pixels do not appear.

In FIGS. 4A and 4B, an example of using the 6-pixel×6-pixel dither patterns in order to simplify the explanation was explained, however, actually dither patterns having a much larger size are used. When the size of the dither patterns is made larger, the cycle of the dot arrangement also becomes larger, and the degree of freedom of the dot arrangement also increases. In order to place importance on dispersibility as in this embodiment, dither patterns that are of about 256 pixels× 256 pixels, 512 pixels×512 pixels, or even larger size and that have a blue-noise characteristic can be said to be practical. In dither patterns that are given such a blue-noise characteristic, it is possible to achieve dispersibility that is equivalent to that in the case of performing quantization by the error diffusion method.

In this way, in this embodiment, as in Japanese Patent No. 4574470, dither patterns are prepared that take into consideration the dispersibility in combinations of plural colors, and care is taken so that a granular feeling does not stand out in image having plural mixed colors. However, in the quantization processing of Japanese Patent No. 4574470, the target for reducing the granular feeling is a combination of quantization results of plural colors, so there were cases in which the dispersibility of quantization results of each of the single colors became worse than before. In regards to this, in this embodiment, dither patterns are prepared so that suitable dispersibility is obtained for single colors and mixed colors. In the following, the generation method for generating the dither patterns that are used in this embodiment will be explained.

Figure 5:
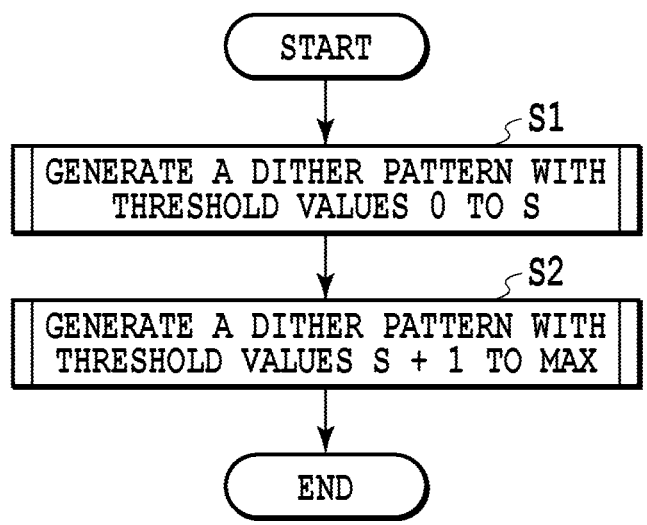
FIG. 5 is a flowchart for explaining a dither pattern generation method for cyan and magenta.

FIG. 5 is a flowchart for explaining the generation method for generating dither patterns for cyan and magenta that will be used in this embodiment. In this embodiment, the multivalue data C', M' that are outputted from the gradation correction processes 302-1 and 302-2 have 256 gradations, and the data that is inputted for each pixel is a value 0 to 255. The threshold values that are set for each of the pixels in the dither pattern are a value 1 to 255, and dots are printed in the scanning of pixels whose input data has a value that is equal to or greater than the set threshold value. In this embodiment, the size of the dither patterns is taken to be 64 pixels×64 pixels, and the pixels are set to individual threshold values 1 to 255. When doing this, for the ease of understanding, threshold values 1 to 254 are set inside the dither pattern for every 16 pixels, and threshold value 255 is set for 32 pixels. Here, it is possible that that the gradation characteristic between gradation 254 and gradation 255 will greatly change, however, this can be removed by the gradation correction processing of 302-1 to 302-4 in FIG. 3 described above.

Referring to FIG. 5, in this embodiment, the threshold values 1 to 255 above are set in two stages. Step S1 is a process for setting threshold values for low-gradation areas, and sets low-level threshold values (1 to S) in the 64-pixel×64-pixel dither pattern. Pixels for which a low-level threshold value 1 to S has been set are pixels for which dots are printed even for low-gradation data. In this embodiment, particularly, in order to reduce the granular feeling in low-gradation areas, threshold values 1 to S are set for pixels having a positional relationship that satisfies the two conditions below.

(Condition 1) The dispersibility of the cyan dot arrangement and the dispersibility of the magenta dot arrangement are both as high as possible.

(Condition 2) Dispersibility that is as high as possible is obtained for the dot arrangement that is a combination of the cyan dot arrangement and the magenta dot arrangement.

The method for setting threshold values that will satisfy conditions 1 and 2 will be explained in detail later.

Continuing, step S2 is a process for setting threshold values in intermediate-gradation and high-gradation areas, and sets threshold values (S+1 to 255) for intermediate to high gradation. Pixels for which threshold values (S+1 to 255) for intermediate gradation and high gradation are set are pixels for which dots are printed for intermediate gradation or greater. In the case where the input image data has a gradation value in the range S+1 to 255, dots are printed for pixels that are set to a threshold value that is equal to or less than that gradation value.

In the intermediate-gradation and high-gradation areas that are set in step S2, the effect that the existence of overlapping dots has on the granular feeling is sufficiently small compared with the low-gradation density areas that are set in step S1. On the other hand, in such gradation areas, the change in density (hue) that occurs when there is a shift in printing position between the printing heads easily becomes a problem. In this case, it can be seen that a small amount of overlapping dots in the combined dot arrangement of the cyan dot arrangement and magenta dot arrangement is preferable. Therefore, in step S2 of this embodiment, dither patterns are generated so that the dot dispersibility of each color is kept as high as possible while at the same time allowing the overlapping of dots in some locations.

Figure 6:
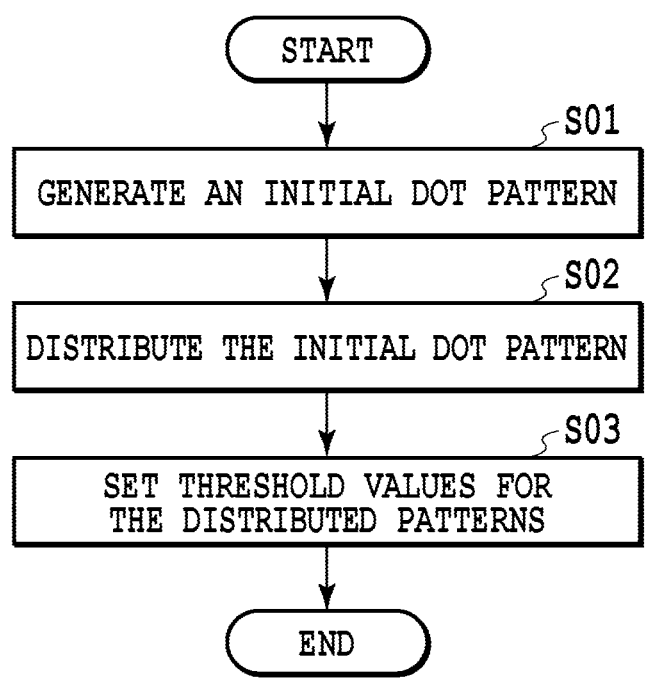
FIG. 6 is a flowchart for explaining the generation process for generating an initial dot pattern.

FIG. 6 is a flowchart for roughly explaining the process of step S1. In this processing, first, in the process of generating an initial dot pattern in step S01, the same numbers of cyan dots and magenta dots (16×S dots) are located in a 64-pixel× 64-pixel dither pattern area. In other words, an initial dot pattern in which (16×2×S) dots are arranged in a state having high dispersibility is generated. Here, in the present invention, the dither pattern area has 64-pixel×64-pixel for 256-gradation, therefore the same threshold value is created for 16-pixels. Hereafter, the number of pixels having the same threshold value in the dither pattern area is indicated "N". The initial dot pattern generated here is a combined dot pattern of cyan dots and magenta dots in which it is presumed that dots are distributed in a cyan dot pattern and magenta dot pattern. Here, as long as the value S is an integer 1 or greater the value S is not particularly limited, and is set to a value such that S×32 dots obtained by combining S×16 cyan dots and S×16 magenta dots can be arranged in a 64-pixel×64-pixel area in state of high dispersibility. In the following, in this specification, the case will be explained in which this kind of value S is the maximum number of dots in the low-gradation areas; and in this example, the maximum number of dots S=12. Here, the number of dots arranged in step S01 is 16×2× 12=384 dots.

Figure 7:
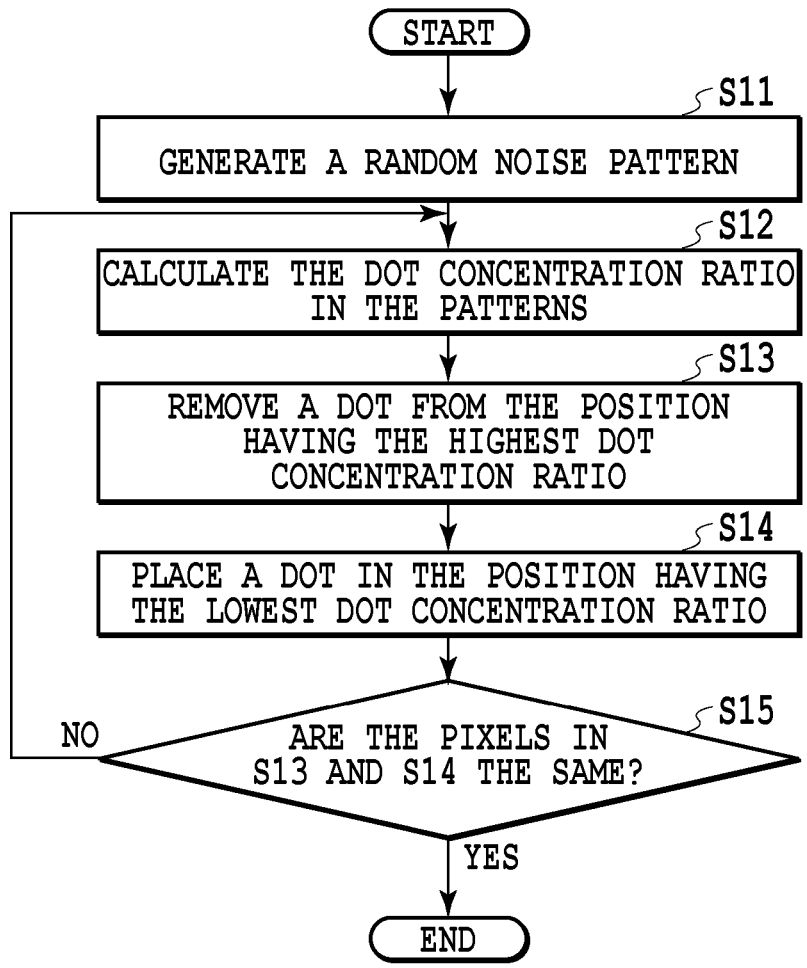
FIG. 7 is a flowchart for explaining the process for generating the initial dot pattern.

FIG. 7 is a flowchart for explaining the process for generating the initial dot pattern in step S01 in FIG. 6. First, in step S11, 16×2×S=384 dots are set at random within a 64-pixel× 64-pixel area.

Continuing, in step S12, a dot concentration ratio for surrounding dots is calculated for each pixel in the pattern. Then, the dot of the pixel that is determined to have the "densest" for dot concentration ratio is removed (step S13), and a dot is added to the pixel that is determined to have the "sparsest" for dot concentration ratio (step S14). The method for calculating the dot concentration ratio can be a method, for example, in which a 3×3 Gaussian filter is used, and the Gaussian filter value for each pixel is taken to be the dot concentration ratio, however, as long a parameter is used that can be a measure for the dot sparseness or denseness, a low-pass filter (LPF) or the like can also be used.

In step S15, it is determined whether or not the position where the dot was removed in step S13 is the same position as the position where the dot was added in step S14. When it is determined that the pixel positions do not coincide, it is determined that the dispersion state of the dots is still not sufficient, so processing returns to step S12, and steps S12 to S15 are repeated. On the other hand, when it is determined that both pixels are in the same position, it is determined that the initial dot pattern is completed, and this processing ends.

Figure 8A:
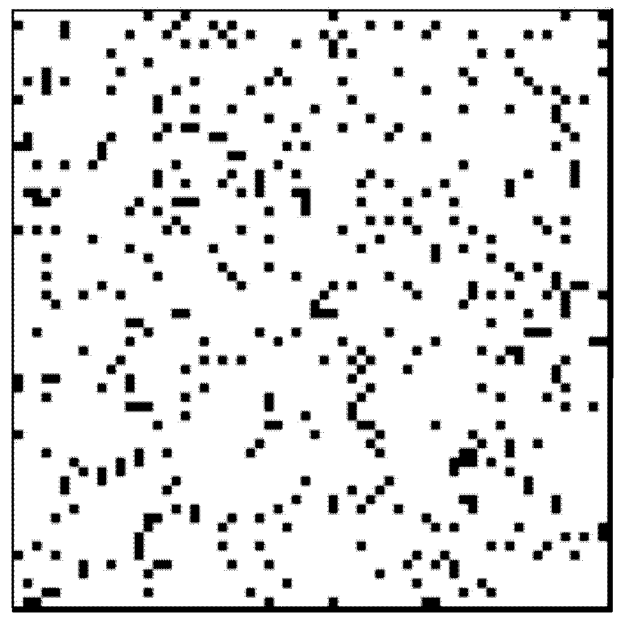
FIGS. 8A and 8B are drawings comparing a random dot pattern and an initial dot pattern.
Figure 8B:
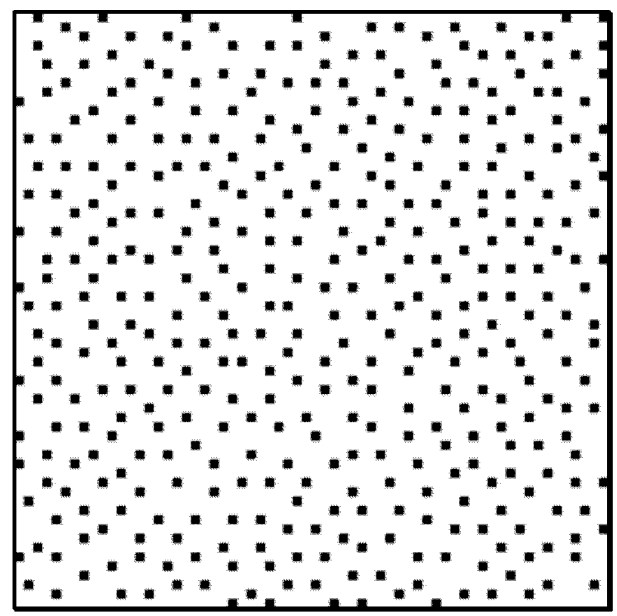

FIGS. 8A and 8B are drawings for comparing the dot pattern that was generated at random in step S11 and the initial dot pattern that was completed by the processing in FIG. 7. It can be seen that in the initial dot pattern that is illustrated in FIG. 8B, the dots are sufficiently dispersed when compared with the dot pattern that is illustrated in FIG. 8A. Generally, the dot arrangement such as in FIG. 8A that was generated at random can be said to have a white-noise characteristic, however, the dot arrangement such as in FIG. 8B can be said to have a blue-noise characteristic. In this embodiment, by using a Gaussian filter or a low-pass filter it is possible to obtain a dot arrangement having excellent dispersibility and having a blue-noise characteristic.

Returning to the flowchart in FIG. 6, in step S02, the initial dot pattern that was generated in step S01 is distributed to the cyan dot pattern and the magenta dot pattern. As the combined pattern of cyan and magenta, a pattern having excellent dispersibility such as in FIG. 8B is already obtained. In this embodiment, in order to obtain a cyan dot pattern and magenta dot pattern having as high dispersibility as possible, the initial dot pattern is distributed to the cyan dot pattern and magenta dot pattern.

Figure 9:
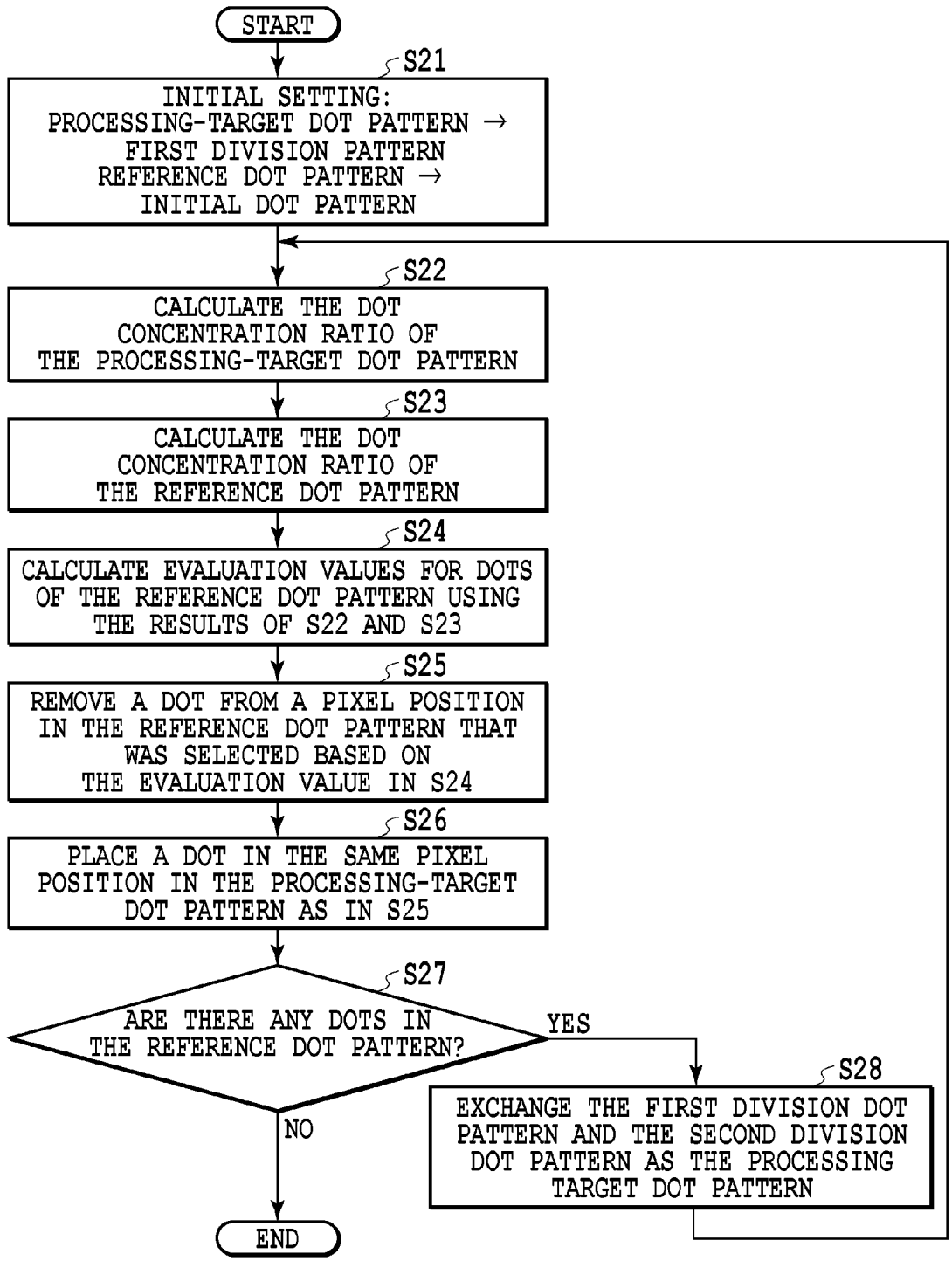
FIG. 9 is a flowchart for explaining a process for distributing initial dot patterns.

FIG. 9 is a flowchart for explaining the process for distributing the initial dot pattern to the cyan dot pattern and magenta dot pattern in step S02 in FIG. 6. Here, the cyan dot pattern is taken to be a first division pattern, and the magenta dot pattern is taken to be a second division pattern. When this processing starts, first, in step S21 the first division pattern is set as a processing-target dot pattern and the initial dot pattern is set as a reference dot pattern.

In step S22, the dot concentration ratio is calculated for all of the pixels inside the processing-target dot pattern. Then, in step S23 the dot concentration ratio is calculated for all of the pixels inside the reference dot pattern. The method for calculating the dot concentration ratio can be a method that uses the Gaussian filter that was used when generating the initial dot pattern, or can be a method that uses a low-pass filter (LPF) or the like.

In step S24, an evaluation value is calculated for all of the pixels from the dot concentration ratio of each of the pixels in the processing-target pattern and dot concentration ratio of each of the pixels in the reference dot pattern that were found in steps S22 and S23. Here, when the dot concentration ratio of the reference dot pattern at coordinates (x, y) is taken to be R(x, y), the dot concentration ratio of the processing-target dot pattern is taken to be O(x, y), and the evaluation value is taken to be V1(x, y), V1(x, y) can be expressed by, for example, the following equation.

$$V1(x,y) = \alpha_1 \times R(x,y) - \alpha_2 \times O(x,y)$$

Here, $\alpha_1$ and $\alpha_2$ are coefficients having positive values. According to the equation above, the larger the evaluation value V1(x, y) is, the higher the dot concentration ratio in the reference dot pattern becomes, and the lower the dot concentration ratio in the processing-target dot pattern becomes.

In step S25, of the entire pixel area (x, y), the pixel (x, y) having the largest evaluation value V1(x, y) is extracted, and the dot that is located at that pixel in the reference pattern is removed. Furthermore, in step S26, a dot is added to that pixel inside the processing-target dot pattern.

In step S27 it is determined whether or not at that point in time there are any remaining dots in the reference dot pattern. When there are remaining dots, processing advances to step S28, and the processing-target dot pattern is replaced. More specifically, at that point in time, when the processing-target pattern is the first division pattern, the second division pattern is set as the processing-target pattern. Moreover, at that point in time, when the processing-target pattern is the second division pattern, the first division pattern is set as the processing-target pattern. After that, processing returns to step S22 in order to distribute the next dot.

The processing from step S22 to step S28 explained above is repeated until it is determined in step S27 that there are no more dots in the reference dot pattern, and then this processing ends.

With this kind of process, dots are distributed in order from dots in the densest positions in the reference pattern to the sparsest positions in each of the first division pattern and second division pattern in an alternating manner.

It was explained above that when the cyan dot pattern was taken to be the first division pattern and the magenta dot pattern was taken to be the second division pattern, dots were assigned in order in an alternating manner starting from the first division pattern for cyan, however, of course, the embodiment is not limited to this. It is also possible for the magenta dot pattern to be the first division pattern, and the cyan dot pattern to be the second division pattern, and to assign dots in order starting from the magenta pattern. Moreover, the replacement of the processing-target dot pattern in step S28 does not necessarily have to be performed every other dot. For example, dots may be assigned by K dots such that, after the 1st to Kth dots are assigned the replacement of the processing-target dot pattern is performed, and then, the (K+1)th to 2Kth dots are assigned. When doing this, in the case of dither patterns in which threshold values 1 to 255 are set for every 16 pixels in a 64-pixel×64-pixel area, as the present invention, N can be N=16.

Moreover, in the explanation above, all of the dots in the initial dot pattern are distributed 1:1 to cyan and magenta; however, in the case where a color tone for which dispersibility is the most important is not 1:1 (blue), the dots of the initial dot pattern can be distributed at the dot ratio that will achieve such a color tone. More specifically, when it is desired to make the dispersibility of dots of the hue closer to cyan than blue the highest, for example, it is possible to give bias to the number of dots distributed such as by first distributing two dots of the dots in the initial dot pattern to cyan, and then distributing one dot to magenta.

Returning again to the flowchart in FIG. 6, in step S03 threshold values 1 to S are set for the positions of dots arranged in the first division pattern and second division pattern in step S02.

Figure 10B:
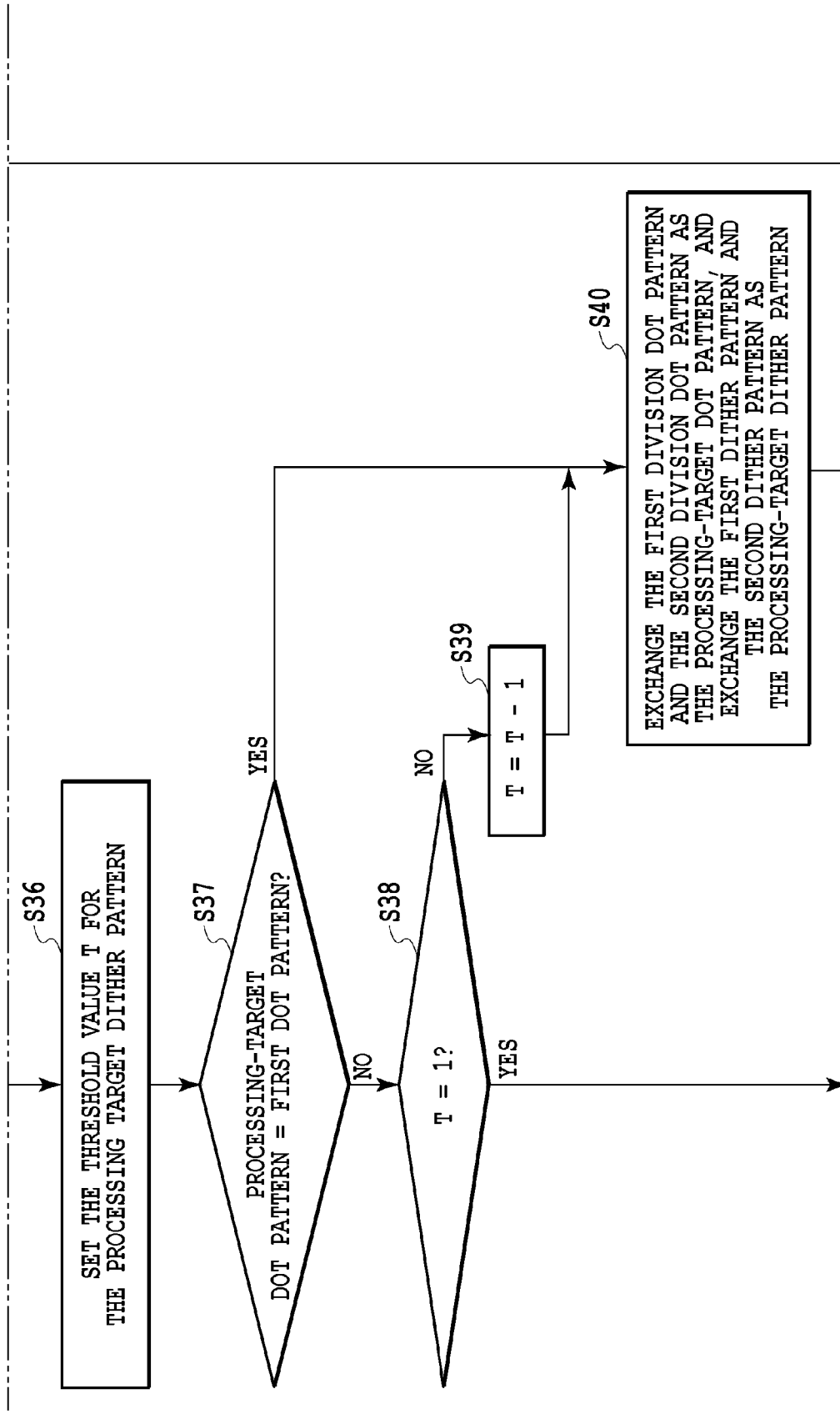
FIG. 10B is a flowchart for explaining a process for setting threshold values.

FIG. 10 is a flowchart for explaining the process for setting threshold values that is executed in step S03 in FIG. 6. In this processing, a first dither pattern is taken to be the cyan dither pattern, and a second dither pattern is taken to be the magenta dither pattern. When this processing begins, first, in step S31, the first division pattern is set as the processing-target dot pattern, the initial dot pattern is set as the reference dot pattern, and the first dither pattern is set as the processing-target dither pattern. Furthermore, S is set as a variable threshold value T (maximum number of dots in the low-gradation area). When doing this, the first division pattern is taken to be the first division pattern in which dots were arranged in step S02, and the initial dot pattern is taken to be the initial dot pattern in which dots were arranged in a state of high dispersibility in step S01.

In step S32, the dot density concentration ratio is calculated for all of the pixels inside the processing-target dot pattern. Moreover, in step S33, the dot concentration ratio is calculated for all of the pixels inside the reference dot pattern. The method for calculating the dot concentration ratio can be a method that uses the Gaussian filter that was used when generating the initial dot pattern, or can be a method that uses a low-pass filter (LPF) or the like.

In step S34, an evaluation value is calculated for all of the pixels from the dot concentration ratio of each of the pixels in the processing-target dot pattern and dot concentration ratio of each of the pixels in the reference dot pattern that were found in steps S32 and S33. Here, when the dot concentration ratio of the reference dot pattern at coordinates (x, y) is taken to be R(x, y), the dot concentration ratio of the processing-target dot pattern is taken to be O(x, y), and the evaluation value is taken to be V2(x, y), V2(x, y) can be expressed by, for example, the following equation.

$$V2(x,y)=\beta 1 \times R(x,y)+\beta 2 \times O(x,y)$$

Here, β1 and β2 are coefficients having positive values. According to the equation above, the larger the evaluation value V2(x, y) is, the higher both the dot concentration ratio in the reference dot pattern and the dot concentration ratio in the processing-target dot pattern become.

In step S35, of the entire pixel area (x, y), 16 pixels (x, y) are extracted in order of the largest evaluation value V2(x, y), and the 16 dots that are located at those pixels in the reference dot pattern and the processing-target dot pattern are removed. Furthermore, in step S36, threshold value T is set for the pixels in the processing-target dither pattern that are correlated with those 16 pixels (first threshold value setting process).

In step S37, it is determined whether or not the processing-target dot pattern at that point in time is the first division pattern. When the processing-target dot pattern is the first division pattern, processing advances to step S40 and the processing-target dot pattern is exchanged, after which, in order to set threshold values for the second dither pattern, processing returns to step S32 and a second threshold value setting process is executed.

On the other hand, in step S37, when the processing-target dot pattern is not the first division pattern, but is the second division pattern, it is then determined in step S38 whether or not the threshold value T is 1 (minimum value). When the threshold value T is not 1, it is determined that there are still threshold values remaining to be set, so the threshold value T is decremented in step S39, and processing advances to step S40. The processing from step S32 to step S40 explained above is repeated until it is determined in step S38 that the threshold value T is 1 (minimum value), after which this processing ends.

With this embodiment explained above, in the initial dot pattern and division dot patterns having high dispersibility, threshold values are set in order from the maximum value S to the minimum value 1 so that threshold values having a high value are set for positions having a high dot concentration ratio.

In step S34, the coefficients β1 and β2 that are used in the calculation of the evaluation value V2 are such that depending on the balance of those values, the dispersibility of the cyan dots and magenta dots in the low-gradation area changes. For example, when β1<β2, more importance is placed on the dot concentration ratio of the processing-target dot pattern, or in other words, a single-color dot pattern, than the dot concentration ratio of the reference dot pattern, or in other words, a mixed color dot pattern, so a dither pattern is obtained in which more importance is placed on the dispersibility of a single color than on that of mixed colors. On the other hand, when β1>β2, more importance is placed on the dot concentration ratio of the reference dot pattern, or in other words, mixed color dot pattern, than that of the processing-target dot pattern, or in other words, single-color dot pattern, so a dither pattern is obtained in which more importance is placed on the dispersibility of mixed colors than on that of a single color. Therefore, preferably, the values of the coefficients β1 and β2 are suitably adjusted according to the degree that a granular feeling stands out during single-color printing and mixed-color printing. Particularly, when using ink color having strong dot power, there is a possibility that a granular feeling will more easily become visibly noticeable during single-color printing than in mixed-color printing. In such a case, it can be said that preferably the coefficient β2 that multiplies the dot concentration ratio of a single-dot pattern is set to be greater than the coefficient β1 that multiplies the dot concentration ratio of a mixed-color dot pattern.

Above it was explained that when the cyan dither pattern is taken to be the first dither pattern, and the magenta dither pattern is taken to be the second dither pattern, threshold values having the same value are assigned in order in an alternating manner for 16 pixels at a time starting from the first dither pattern for cyan, however, needless to say, the embodiment is not limited to this. It is also possible to take the magenta dither pattern to be the first dither pattern, and take the cyan dither pattern to be the second dither pattern, and to assign dots in order starting from the magenta dither pattern. Moreover, it is also possible to change (decrement) the threshold value T after repeating the processing of steps S32 to S37 16 times, instead of assigning the equivalent threshold values to 16 pixels at the same time.

All of the processes of steps S01 to S03 illustrated in FIG. 6 end according to the flowcharts explained above using FIGS. 7, 9 and 10, and step S1 (generation of a dither pattern for a low-gradation area) in FIG. 5 is completed.

Next, the process in step S2 in FIG. 5 for setting threshold values (S+1 to 255) for intermediate-gradation and high-gradation areas will be explained.

Figure 11:
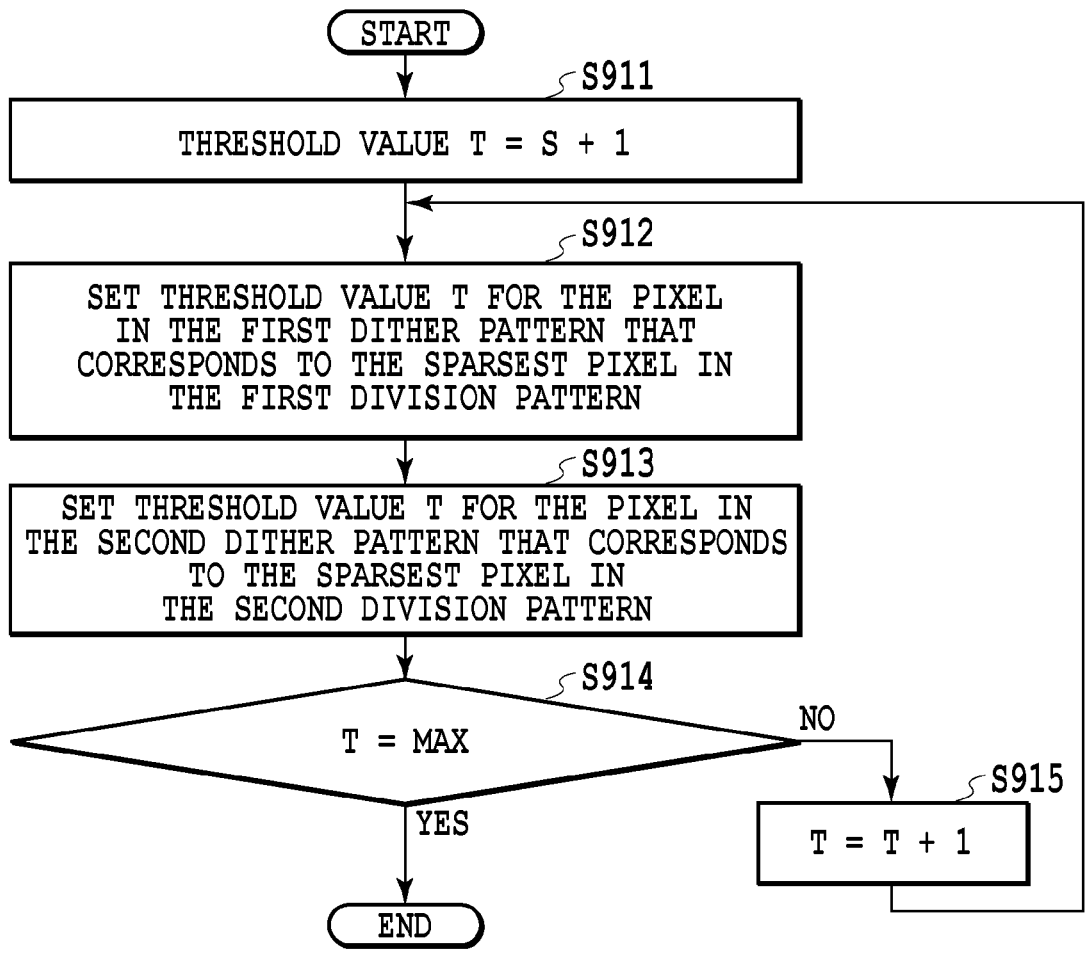
FIG. 11 is a flowchart for explaining in detail a process for setting threshold values in intermediate-gradation and high-gradation areas.

FIG. 11 is a flowchart for explaining in detail the process in step S2 for setting threshold values (S+1 or more) for intermediate-gradation and high-gradation areas. This processing sets threshold values for intermediate-gradation and high-gradation areas based on the first division pattern and second division pattern at the time when step S02 is completed. When this processing starts, first, in step S911, a variable threshold value T is set to S+1.

In step S912, the first division pattern is referenced, and 16 pixels having the lowest dot concentration ratio are selected from among the pixels in which dots are not placed. Then, a dot is added to the positions of those 16 pixels in the first division pattern, and the threshold value T is set for 16 pixels in the first dither pattern that correspond to those 16 pixels (third threshold value setting process). Moreover, in step S913, the second division pattern is referenced, and 16 pixels having the lowest dot concentration ratio are selected from among the pixels in which dots are not placed. Then a dot is added to the positions of those 16 pixels in the second division pattern, and the threshold value T is set for 16 pixels in the second dither pattern that correspond to those 16 pixels (fourth threshold value setting process).

In step S914, it is determined whether or not the threshold value T is T=MAX (=255), and when T<MAX, there are still threshold values to be set, so the threshold value T is incremented in step S915, after which processing returns to step S912. On the other hand, in step S914, when T=MAX, all of the threshold values have been set, so processing ends.

Above, the processing explained in FIG. 5, or in other words, the setting of threshold values for the low-gradation areas and intermediate-gradation and high-gradation areas is complete, and the cyan dither pattern and magenta dither pattern that are used in this embodiment are complete.

With the dither pattern generation method of this embodiment explained above, a dot arrangement having excellent dispersibility is obtained for a single cyan color, single magenta color and two colors cyan and magenta in low-gradation areas where it is easy for a granular feeling of the dots to become a problem. More specifically, threshold values are set so that setting the same threshold values to the same pixels is completely avoided, and the threshold values are set so that there is a set distance or greater between all of the dots. As a result, even when there is a small amount of shifting of the printing position between cyan and magenta during printing, dots that are supposed to be separated do not overlap, and dots that are supposed to overlap are not separated, so it becomes difficult for a displacement of hue due to this to occur.

On the other hand, in intermediate-gradation and high-gradation areas where, together with the granular feeling of dots, the hue displacement due to shifting of the printing position becomes a problem, threshold values are set in a state in which setting each other's threshold values to the same pixels for single cyan color and single magenta color is not prohibited, while placing importance on dispersibility. As a result, even when there is a small amount of shifting of the printing position between cyan and magenta during printing, it is possible to suppress the number of overlapping dots to a specified range, and to suppress hue displacement due to that shifting.

(Variation of the First Embodiment)

The object of this variation is to go beyond the first embodiment described above in actively suppressing hue displacement due to shifting of the printing position that is particularly a problem in intermediate-gradation areas, and here a method for setting threshold values for intermediate-gradation areas will be explained. In other words, the method for setting threshold values that will be explained in this variation corresponds to step S2 in FIG. 5.

Figure 12A:
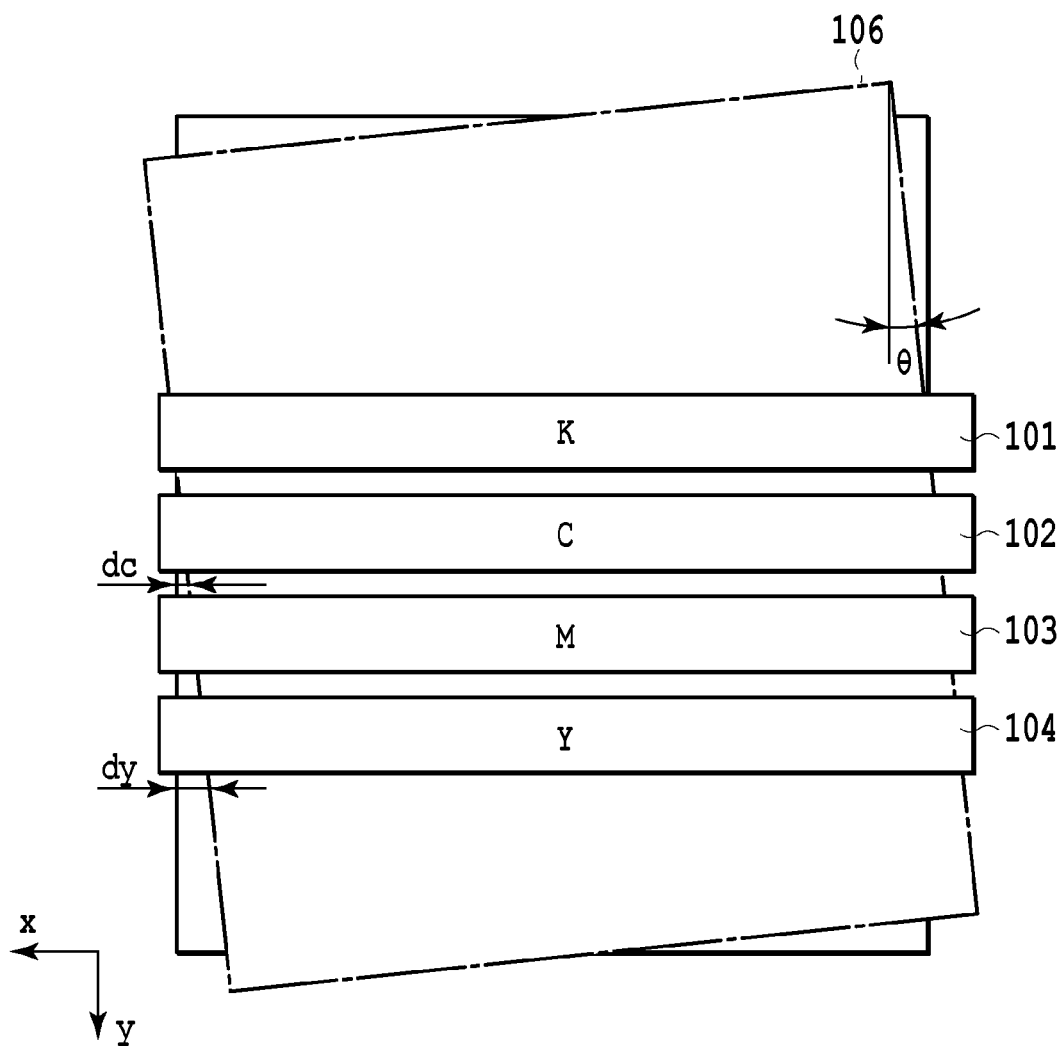
FIGS. 12A and 12B are schematic diagrams for explaining a shift in the printing position.
Figure 12B:
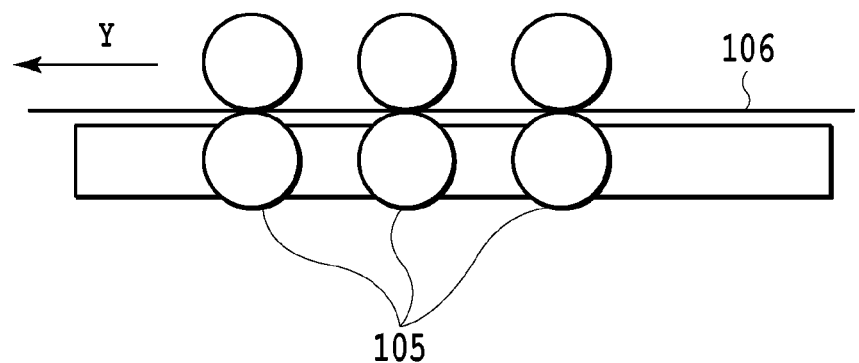

FIGS. 12A and 12B are schematic drawings for explaining a shift in the printing position in a full-line printing apparatus. As illustrated in FIG. 12A, in a full-line printing apparatus the printing medium 106 (dashed lines) may be supplied and conveyed diagonally with respect to the printing heads 101 to 104. FIG. 12A illustrates the state in which the printing medium 106 is conveyed at an angle θ with respect to the normal conveying direction. In this case, the positions where the four printing heads 101 to 104 print on the printing medium are shifted in the X direction. In the case illustrated in FIG. 12A, the position where the cyan printing head 102 prints with respect to the position where the black printing head 101 prints is shifted an amount dc in the X direction, and the position where the yellow printing head 104 print is shifted a larger amount dy.

FIG. 12B is a cross-sectional drawing for explaining the conveying state of the printing medium 106. Here, the state is illustrated in which the printing medium 106 is conveyed in the direction of the arrow in FIG. 12B while being held by three sets of conveying rollers 105. Normally, the rollers that are located underneath the printing medium 106 are drive rollers, and the rollers that are located above are following rollers that rotate by following the rotation of the drive rollers, however, these three sets of roller pairs are not limited to being precise cylinders. Therefore, each time the drive rollers rotate one time, the distance the printing medium 106 is conveyed in accordance to that rotation is not stable, and the printing position of the printing head 101 to 104 of each color may also shift in the Y direction.

In this way, when there is shifting of the printing position of each of the printing heads in the X direction or Y direction, the overlapping state of dots in the dot groups that are printed by the individual printing heads changes. For example, dots of two colors in the image data that are supposed to be overlapped at the same position become separated, or dots of two colors that are supposed to be separated are overlapped. As has already been explained, dither patterns are generated for the low-gradation areas of this embodiment so that the dots of each color are arranged so as to be sufficiently distributed for single colors and for mixed colors, so it becomes difficult for separation of overlapping dots or overlapping of independent dots due to a shift in the printing position to occur. However, in intermediate-gradation and high-gradation areas, even though the dots are arranged so as to maintain a high level of dispersibility, there is already a large number of dot to be printed, so the distance between dots becomes shorter, and it becomes impossible to avoid overlapping of dots due to a shifting of the printing position described above. Even when dots of different colors that are supposed to be overlapped are separated, or dots of different colors that are supposed to be separated are overlapped, the hue that is expressed by a collection of single dots, and the hue that is expressed by a collection of overlapping dots differ, so a color that has shifted from the target hue is expressed. For example, when expressing blue by a cyan dot group and a magenta dot group, in a blue image that is printed without allowing any of the cyan dots and magenta dot to overlap at all, and in a blue image that is printed by overlapping cyan dots and magenta dots, the difference in hue is visually noticeable.

Therefore, in the case of such an intermediate-gradation area, even when dots that are supposed to be separated overlap due to shifting of the printing position, quantization processing has already been proposed in which overlapping dots are prepared in advance so that about the same number of overlapping dots are separated. By being able to keep the number of locations where dots that are supposed to be separated overlap and the number of locations where dots that are supposed to overlap are separated within a specified range, it is possible to suppress displacement of the hue without much fluctuation in the ratio of independent dots and overlapping dots inside the area. Therefore, in this variation, for intermediate-gradation areas and high-gradation areas, a dither pattern is generated in which these kinds of overlapping dots can be prepared in advance.

Figure 13:
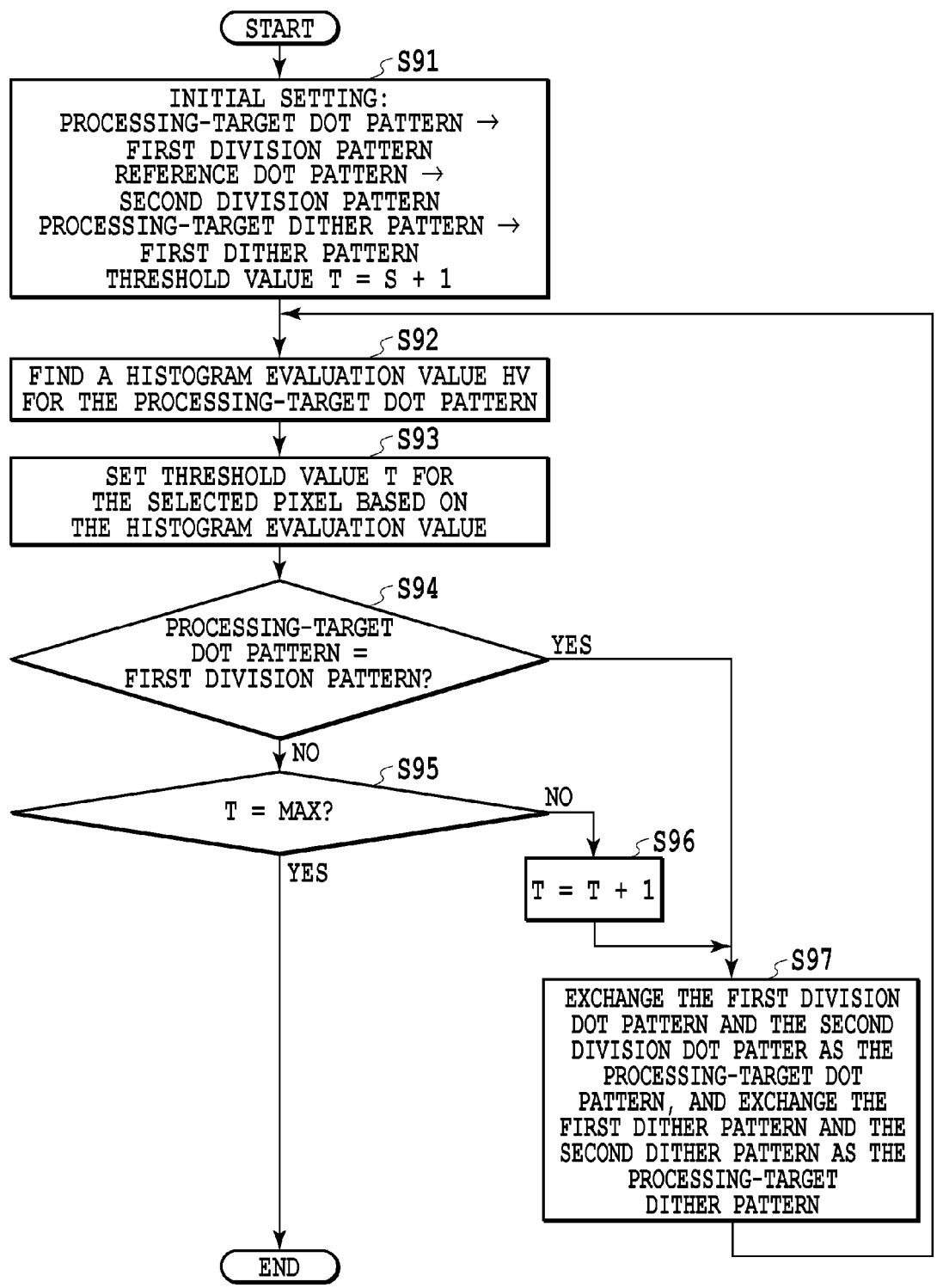
FIG. 13 is a flowchart for explaining a process for setting threshold values in intermediate-gradation and high-gradation areas in a variation.

FIG. 13 is a flowchart for explaining in detail the process executed in step S2 in FIG. 5 in this variation for setting threshold values (S+1 to 255) for the intermediate-gradation and high-gradation areas. When this processing starts, first, in step S91, the first division pattern is set to be the processing-target dot pattern, the second division pattern is set to be the reference dot pattern, and the first dither pattern is set to be the processing-target dither pattern. Furthermore, the variable threshold value T is set to T=S+1. Here, the first division pattern and second division pattern are the first division pattern and second division pattern at the point in time when step S02 in FIG. 6 has ended.

Continuing, in step S92, a histogram is acquired for the processing-target dot pattern with respect to the reference dot pattern. The histogram will be explained in detail below.

FIG. 14 is a drawing for explaining a method for acquiring a histogram. For example, Table 1 illustrates a state in which the number of print pixels existing in the reference dot pattern, in the pixels that are adjacent above, below, on the left and on the right of print pixels of interest in the processing-target dot pattern and the pixel in the same position as the print pixels of interest are counted. In this case, only the pixel on the left side with respect to the print pixel of interest is also a print pixel in the reference dot pattern. Therefore, only the field for "left" in Table 1 is 1. If there were a print pixel of the reference dither pattern that was adjacent in the right direction, the field for "right" in the table would also become 1, and if there were a print pixel of the reference dither pattern in the same position as the print pixel of interest, the field "same" would also become 1. In this variation, this kind of count is performed for all of the pixels of the processing-target dither pattern, and the result of adding for above, below, left, right and same is taken to be the histogram of that dot pattern.

In step S93 in FIG. 13, one pixel is selected from among the pixels in the reference dot pattern for which there is still no dot so that the distribution in the histogram obtained in step S92 becomes as uniform as possible, and a dot is placed in that pixel. Furthermore, the threshold value T is set for that pixel position in the processing-target dither pattern. For example, the case will be considered in which when employing the histogram explained in Table 1, the fields "above", "below", "left" and "same" are all 2, and the field "right" is 1. Here, a pixel for which a print pixel in the reference dither pattern exists in the pixel adjacent on the right becomes a pixel in the processing-target dot pattern in which a dot will be placed next, or in other words, becomes a pixel in the processing-target dither pattern for which the threshold value T will be set. Print pixels should be set preferentially in positions such that the histogram distribution becomes as uniform as possible, and it is not absolutely necessary to increase the count value of the field having the smallest count value.

In step S94, it is determined whether or not the current processing-target dot pattern is the first division pattern. When the current processing-target dot pattern is the first division pattern, processing advances to step S97, and the processing-target pattern and the processing-target dither pattern at the present point in time are exchanged with the reference dot pattern and the reference dither pattern at that present point in time, after which processing returns to step S92. On the other hand, in step S94, when the current processing-target dot pattern is not the first division pattern, or in other words, when the processing-target dot pattern is the second division pattern, processing advances to step S95, and it is determined whether or not the threshold value T that was set in step S93 is T=MAX (255). When T<MAX, there is still a threshold value remaining to be set, so in step S96 the threshold value T is incremented, after which processing advances to step S97, and the processing-target dot pattern and processing-target dither pattern are exchanged.

The processing from step S92 to step S97 explained above is repeated until it is determined in step S95 that the threshold value T is the MAX (255), after which this processing ends.

Figure 15:
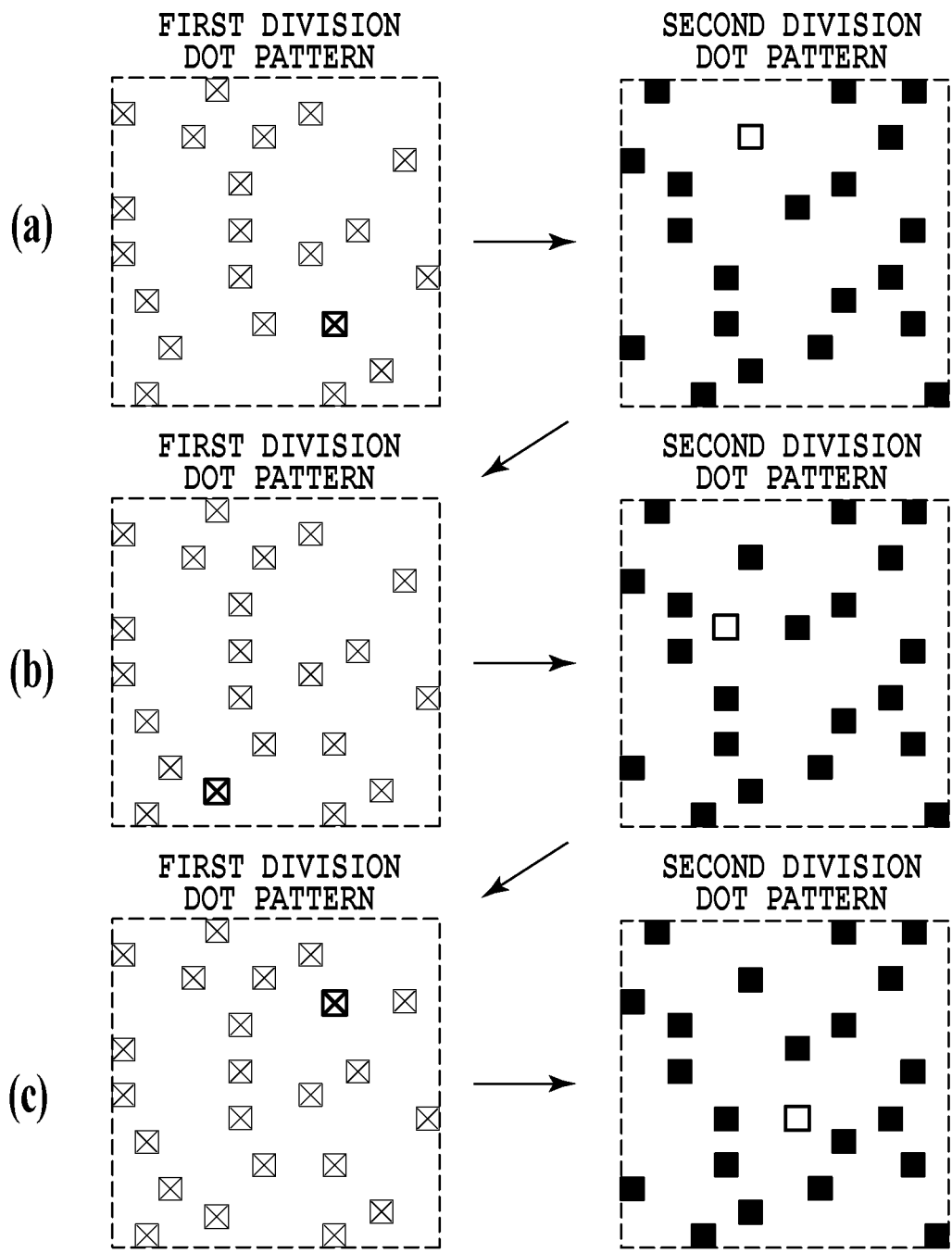
FIG. 15 is a drawing illustrating a state in which print pixels are set in a first division pattern and a second division pattern.

FIG. 15 is a drawing illustrating the state of alternately setting print pixels (pixels for which threshold values have been set) in the first division pattern and second division pattern according to the flowchart in FIG. 13. In FIG. 15, a blank square indicates a pixel for which a dot is to be newly placed, or in other words, a pixel for which the threshold value T is to be newly set. In the two dither patterns, as the threshold value T increases such as FIGS. 15A, 15B, 15C print pixels are set one at a time so that as much as possible the adjacent positions above, below, left and right have no bias.

Incidentally, in the histogram that is acquired in step S92 in FIG. 13, the counting range of the reference dot pattern is not limited to the positions above, below, left, right and same as in Table 1 in FIG. 14. For example, Table 2 in FIG. 14 illustrates the case of counting the number of print pixels that exist in pixels in a two-pixel range adjacent above and below the print pixel of interest and in the same position as the print pixel of interest in the processing-target dot pattern. Furthermore, Table 3 illustrates the case of counting the number of print pixel that exist in the pixel area of 8 pixels that surround the print pixel of interest and in the same position as the print pixel of interest in the processing-target dot pattern. In any case, the histogram is created by adding the count result for each pixel for all of the pixels in the processing-target dither pattern.

Preferably, this kind of histogram is appropriately adjusted according to the direction and amount for which shifting of the printing position easily occurs. For example, the example of Table 1 is useful in the case where shifting of the printing position equally occurs in any direction above, below, left and right. This is because, even though shifting of the printing position occurs in one of the directions, it is possible to make the number of separated overlapping dots and number of overlapping adjacent dots about the same. On the other hand, in the case where shifting of the printing position mainly occurs in the conveying direction (up/down direction), a histogram such as in Table 2 that counts two successive adjacent pixels above or below is useful. Moreover, in the case where shifting of the printing position occurs in all directions including diagonal directions, it is possible to perform counting for a 3×3 pixel range with a print pixel in the center as in Table 3. Furthermore, it is possible to perform specified weighting of individual count values according to tendencies in the shifting direction or shifting amount, and to set the threshold value T for pixels that will make each of the count values as uniform as possible after the weighting process. In any case, the histogram should be prepared for a suitable area according to the direction and amount of shifting of the printing position that the printing apparatus has. Furthermore, shifting of the printing position such as described above may differ according to the type of printing medium, the printing mode, and the like. Therefore, by preparing a histogram according to each printing mode, and generating and storing plural dither patterns according to those histograms in the printing apparatus in advance, it becomes possible to perform quantization processing using a suitable dither pattern for any printing mode.

Figure 16:
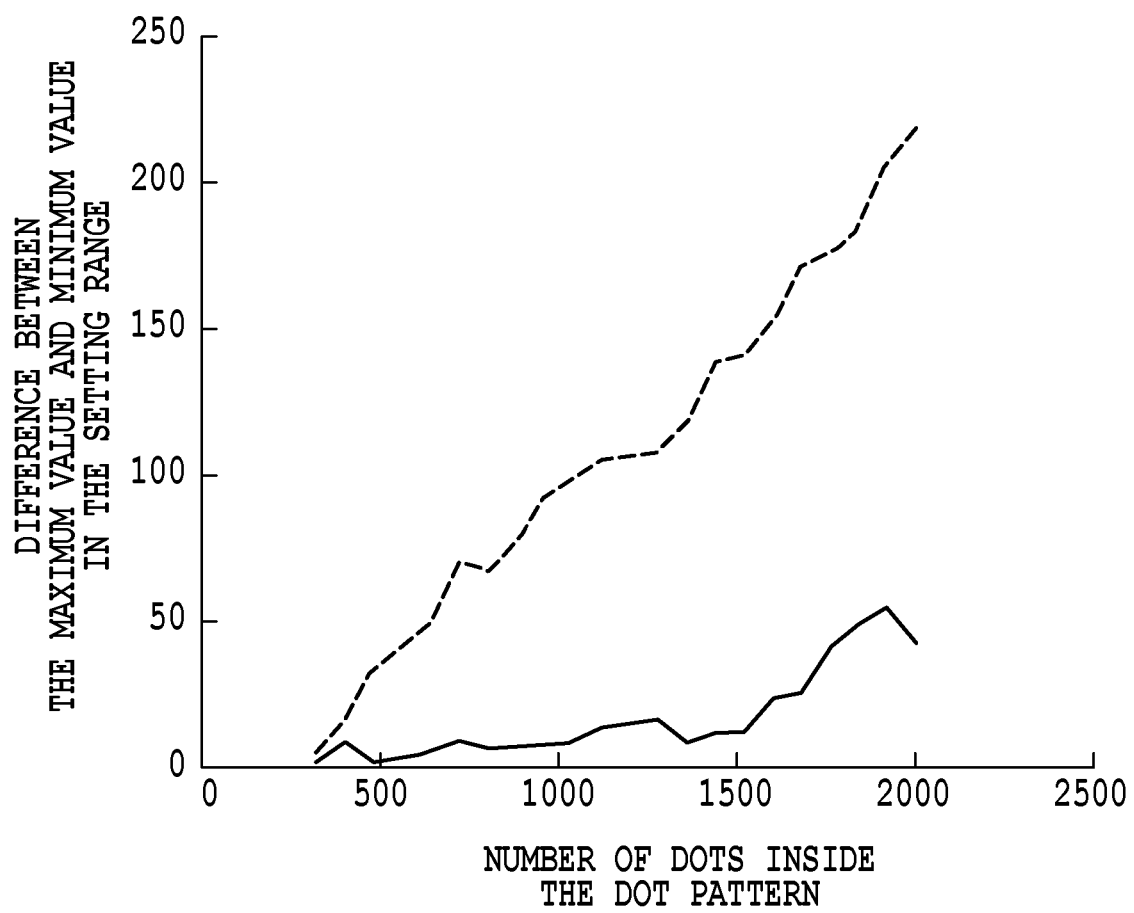
FIG. 16 is a drawing illustrating the effect of reducing histogram bias.

FIG. 16 is a graph that compares the histogram bias in a 64×64 pixel area for the case in which print pixels for two division patterns are set using the histogram of Table 1, and for the case in which print pixels are set with no correlation. The horizontal axis indicates the number of print pixels inside a 64×64 pixel area, and the vertical axis indicates the difference between the maximum value and minimum value of the count values in the histogram. The larger the difference between the maximum value and minimum value is, the larger the histogram bias is.

When two dither patterns are generated with no correlation, the difference between the maximum value and minimum value becomes about 10% of the total number of pixels as indicated by the dashed line in FIG. 16. When this amount of difference occurs, a granular feeling may become visually noticeable depending on the ink color. On the other hand, when two dither patterns are generated so that there is as little histogram bias as possible such as in this embodiment, the difference between the maximum value and the minimum value can be kept to less than 10% of the number of all pixels as indicated by the solid line in FIG. 16. Therefore, it is possible to suppress a granular feeling for any ink so as not to be visually noticeable.

As was explained above, with this variation, by managing dots to be placed at and around the print pixels in the intermediate-gradation and high-gradation areas beforehand, it is possible to keep the ratio of newly overlapping dots and separated dots within a fixed range even when shifting of the printing position occurs. As a result, it is possible to more actively suppress the hue displacement due to shifting of the printing position than was done in the first embodiment.

Incidentally, in this variation, setting all of the threshold values (S+1 to 255) in the intermediate-gradation and high-gradation areas using the histograms illustrated in FIG. 13 was explained. However, often it is the intermediate-gradation areas where the adverse effects of changes in hue due to shifting of the printing position can be most easily noticed, and in high-gradation areas the effects hardly stand out at all. Therefore, in the high-gradation areas it is also possible to set threshold values according to the flowchart in FIG. 11 that was explained in the first embodiment without using a histogram. In that case, in the process for setting threshold values illustrated in FIG. 5, three processes should be prepared: a process for low-gradation areas, a process for intermediate-gradation areas, and a process for high-gradation areas. Then, after the threshold values (1 to S) have been set for the low-gradation areas according to FIG. 6, the threshold values (S+1 to H) are set for the intermediate-gradation areas according to FIG. 13, and the threshold values (H+1 to 255) are set for the high-gradation areas according to FIG. 11.

Second Embodiment

Next, a second embodiment of the present invention will be explained. In this embodiment as well, after threshold values have been set for the low-gradation areas (1 to S) according to FIG. 5, threshold values are set for the intermediate-gradation and high-gradation areas (S+1 to 255). When doing this, in the first embodiment an initial dot pattern, which is a combination of two dither patterns, was generated first, after which the dither pattern was divided into two dot patterns. However, in this embodiment, after a dot pattern for a first color has been generated as an initial dot pattern, a dot pattern for a second color is generated while referencing the initial dot pattern.

Figure 17:
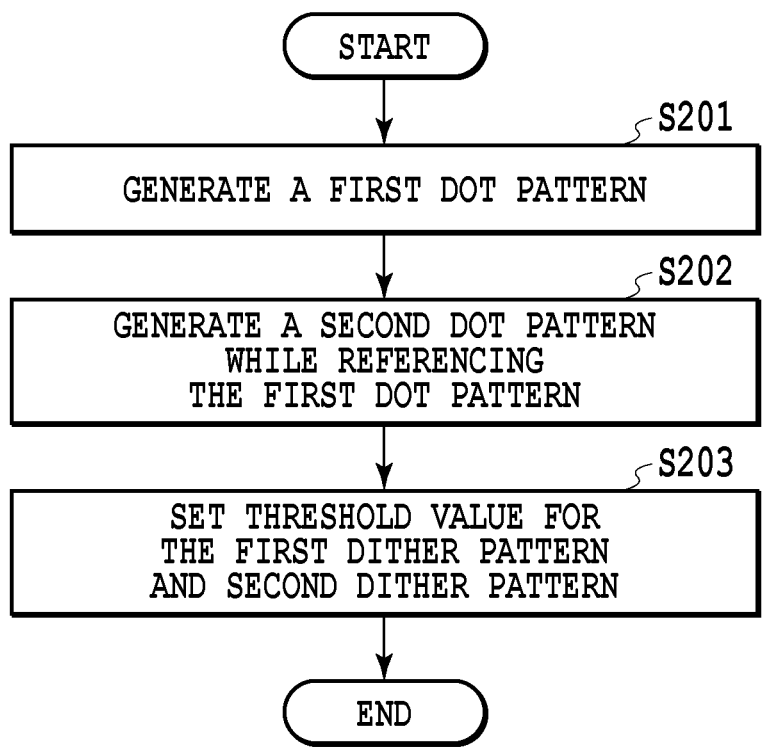
FIG. 17 is a flowchart for roughly explaining a process for setting threshold values in low-gradation areas.

FIG. 17 is a flowchart for roughly explaining the threshold setting process (step S1 in FIG. 5) for the low-gradation areas (1 to S). In this processing, first, in a process for generating the first dot pattern in step S201, a first dot pattern for cyan is generated in a 64-pixel×64-pixel area. Next, in a process for generating a second dot pattern in step S202, a second dot pattern for magenta is generated while referencing the first dot pattern that was generated in step S201. Furthermore, in step S203, a first dither pattern for cyan and a second dither pattern for magenta are generated based on the generated first dot pattern and second dot pattern. Then this processing ends.

The method for generating the first dot pattern in step S201 is the same as the method for generating the initial dot pattern that was explained using the flowchart in FIG. 7 for the first embodiment, so an explanation thereof is omitted. However, in the first embodiment, N (N=16 in the first embodiment)× 2×S dots for the cyan portion and magenta portion are arranged in the initial dot pattern, however, in this embodiment N (N=16 in the second embodiment)×S dots are arranged in the first dot pattern for the single color cyan.

Figure 18:
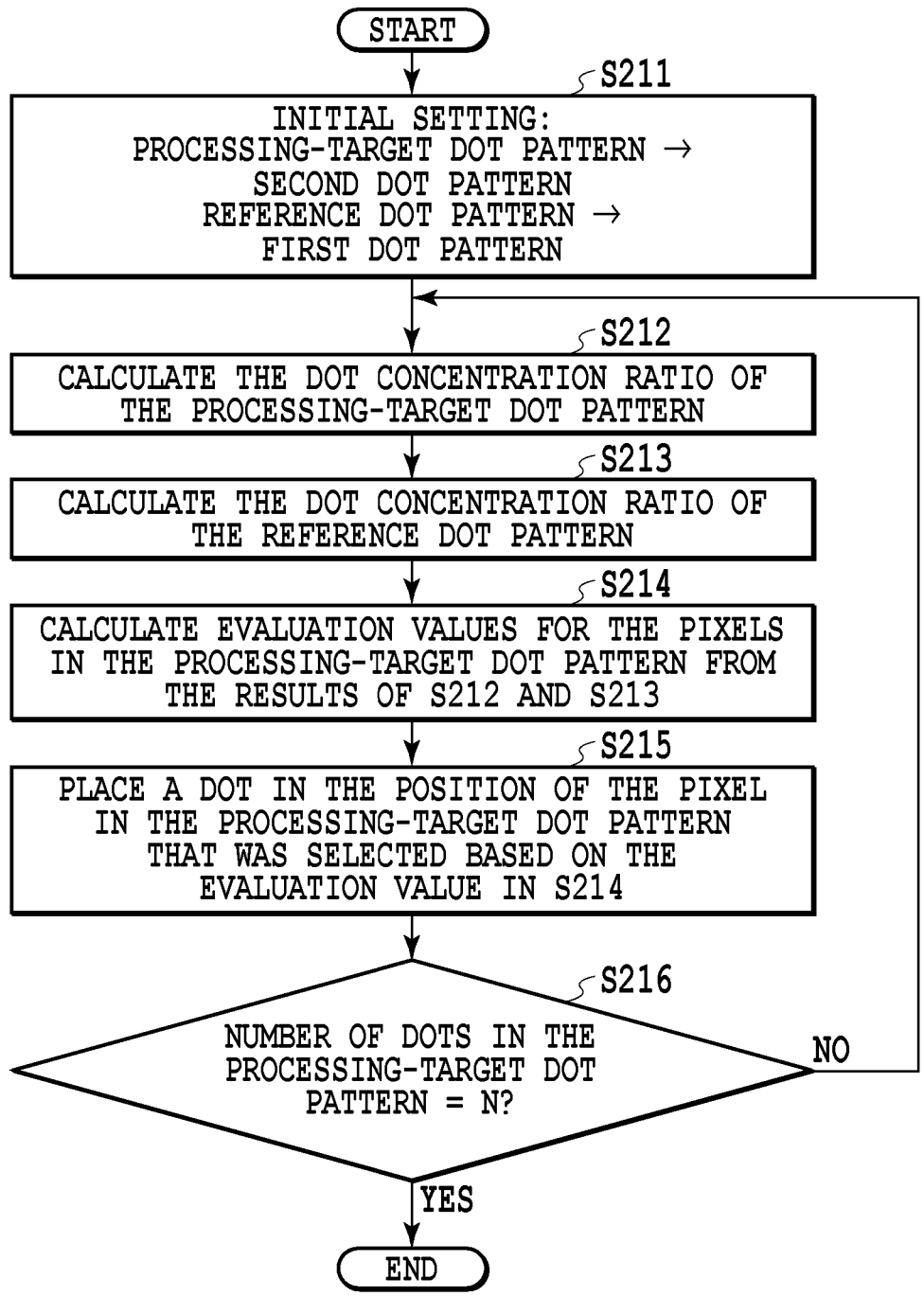
FIG. 18 is a flowchart for explaining a process for generating a second dot pattern.

FIG. 18 is a flowchart for explaining the process for generating the second dot pattern in step S202. After this processing starts, first, in step S211, the second dot pattern is set as the processing-target dot pattern, and the first dot pattern that was generated in step S201 is set as the reference dot pattern. Here, as in the first dot pattern, N×S dots are set. For example, in the initial stage, the number of dot in the processing-target dot pattern is zero.

In step S212, the dot concentration ratios are calculated for all of the pixels inside the processing-target dot pattern. In step S213, the dot concentration ratios are calculated for all of the pixels inside the reference dot pattern. The method for calculating the dot concentration ratio is the same as in the embodiment described above, in which it is possible to use a Gaussian filter that was used when the initial dot pattern was generated, or it is possible to use a low-pass filter (LPF) or the like.

In step S214, evaluation values for all of the pixels are calculated from the dot concentration ratios for each pixel in the processing-target dot pattern that was found in steps S212 and S213, and from the dot concentration ratios for each pixel in the reference dot pattern that was found in step S213. Here, when a dot concentration ratio of the reference dot pattern at coordinates (x, y) is taken to be R(x, y), the dot concentration ratio of the processing-target dot pattern is taken to be O(x, y), and the evaluation value is taken to be V3(x, y), V3(x, y) can be expressed by, for example, the following equation.

$$V3(x,y)=-\gamma 1 \times R(x,y)-\gamma 2 \times O(x,y)$$

Here, $\gamma 1$ and $\gamma 2$ are coefficients having positive values. According to the equation above, the larger the evaluation value V3(x, y) is, the lower the dot concentration ratio in the reference dot pattern becomes, and the lower the dot concentration ratio in the processing-target dot pattern becomes.

In step S215, of the entire pixel area (x, y), the pixel (x, y) having the largest evaluation value V3(x, y) is extracted and a dot is placed in that pixel in the processing-target dot pattern.

In step S216, it is determined whether or not N number of dots are arranged in the processing-target dot pattern at the present point in time. When it is determined that the number of dots that are arranged in the processing-target dot pattern has not yet reached N number of dots, processing returns to step S212 in order to place the next dot. On the other hand, when it is determined that the number of dot arranged in the processing-target dot pattern has reached N number of dots, this processing ends.

Figure 19A:
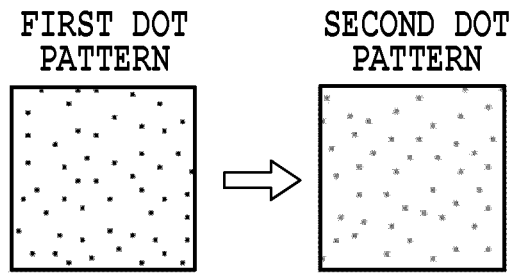
FIGS. 19A and 19B are drawings illustrating the arrangement states of first and second dot patterns.
Figure 19B:
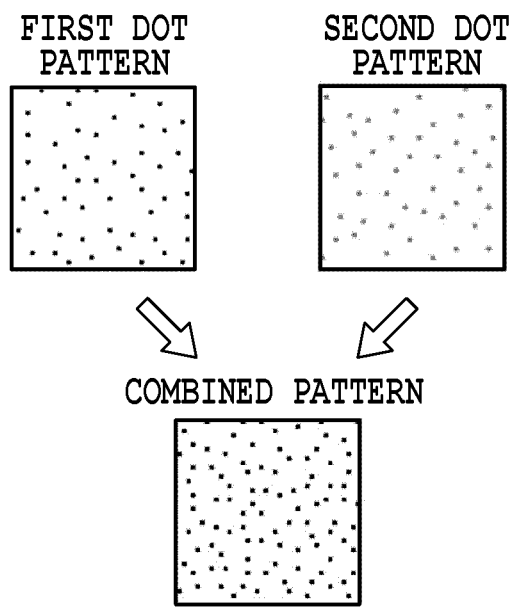

FIGS. 19A and 19B are drawings illustrating the dot arrangements of the first dot pattern for cyan and the second dot pattern for magenta that were generated at the point in time when step S202 in FIG. 17 ended. Referring to FIG. 19A, with this embodiment, first, in step S201 a first dot pattern having a state of high dispersibility was generated. Then, in step S202, a second dot pattern was generated so as to satisfy the condition expressions above, or in other words, so that the highest dispersibility possible can be obtained in the first dot pattern and in the second dot pattern. Therefore, referring to FIG. 19B, dot arrangement having high dispersibility is also obtained in a combined dot pattern that is obtained as a result of putting together these two dot patterns.

In this embodiment as well, as in the first embodiment, when the color tone for which dispersibility is the most important is not 1:1 (blue), the dots of the initial dot pattern can be distributed at the dot ratio that will achieve such a color tone. In this embodiment, when it is desired to place the importance of dispersibility more on dots of a hue nearer to cyan than blue, for example, a first dot pattern in which N×1.5×S number of dots are arranged in a state having high dispersibility can be generated, after which a second dot pattern in which N×0.5×S number of dots are arranged in a state having high dispersibility can be generated.

Returning to the flowchart in FIG. 17 again, after the first dot pattern and second dot pattern have been completed in steps S201 and S202, processing advances to step S203, and threshold values 1 to S are set for each of the dot positions in the first dot pattern and second dot pattern.

Figure 20B:
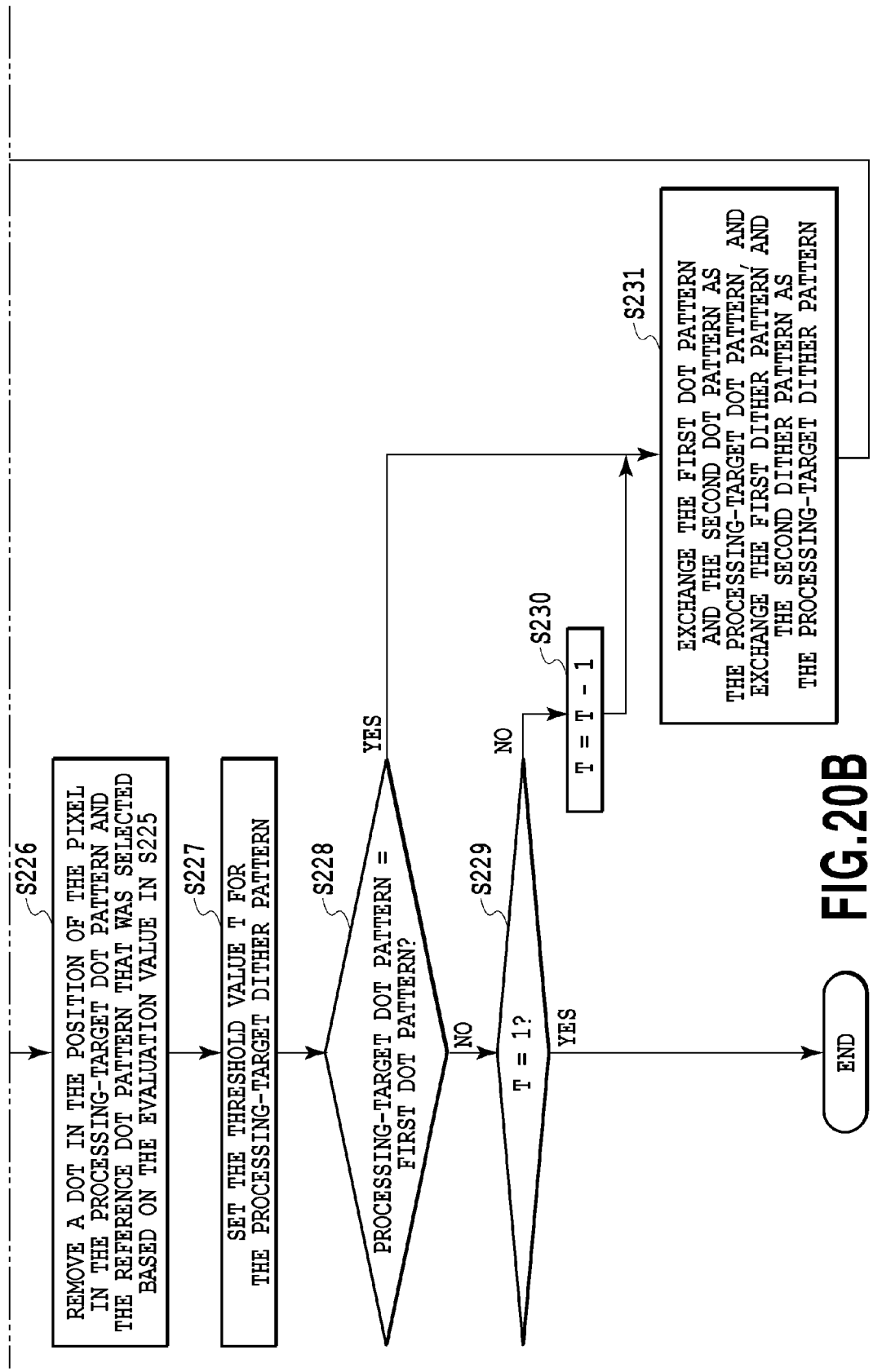
FIG. 20B is a flowchart for explaining a process for setting threshold values in a second embodiment of the present invention.

FIG. 20 is a flowchart for explaining the process executed in step S303 in FIG. 17 for setting threshold values. In this processing, the first dither pattern is taken to be a dither pattern for cyan, and the second dither pattern is taken to be a dither pattern for magenta. After this processing starts, first, in step S221, a combined dot pattern is generated by combining the first dot pattern and the second dot pattern.

Furthermore, in step S222, the first dot pattern is set to be the processing-target dot pattern, the combined dot pattern is set to be the reference dot pattern, and the first dither pattern is set to be the processing-target dither pattern. Moreover, a variable threshold value T is set to S (maximum number of dots in the low-gradation areas).

In step S223, the dot concentration ratios are calculated for all pixels inside the processing-target dot pattern. In step S224, the dot concentration ratios are calculated for all pixels inside the reference dot pattern. The method for calculating the dot concentration ratio can be a method that uses a Gaussian filter, or can be a low-pass filter (LPF) or the like.

In step S225, evaluation values are calculated for all of the pixels from the dot concentration ratios of each of the pixels in the reference dot pattern and dot concentration ratios of each of the pixels in the processing-target dot pattern that were found in steps S223 and S224. Here, when the dot concentration ratio of the reference dot pattern at coordinates (x, y) is taken to be R(x, y), the dot concentration ratio of the processing-target dot pattern is taken to be O(x, y), and the evaluation value is taken to be V4(x, y), V4(x, y) can be expressed by, for example, the following equation.

$$V4(x,y)=\delta 1 \times R(x,y)+\delta 2 \times O(x,y)$$

Here, $\delta 1$ and $\delta 2$ are coefficients having positive values. According to the equation above, the larger the evaluation value V4(x, y) is, the higher both the dot concentration ratio in the reference dot pattern and the dot concentration ratio in the processing-target dot pattern become.

In step S226, of the entire pixel area (x, y), 16 pixels (x, y) are extracted in order of the largest evaluation value V4(x, y), and the 16 dots that are located in those pixels in the processing-target dot pattern and reference dot pattern are removed. Furthermore, in step S227, the threshold value T is set for the 16 pixels in the processing-target dither pattern.

In step S228, it is determined whether or not the processing-target dot pattern at the current point in time is the first dot pattern. When the processing-target dot pattern is the first dot pattern, processing advances to step S231 and the processing-target dot pattern and reference dither pattern are exchanged, after which, in order to set threshold values for the second dither pattern, processing returns to step S223.

On the other hand, in step S228, when the processing-target dot pattern is not the first dot pattern, but is the second dot pattern, it is then determined in step S229 whether or not the threshold value T is 1 (minimum value). When the threshold value T is not 1, it is determined that there are still threshold values remaining to be set, so the threshold value T is decremented in step S230, and processing advances to step S231. The processing from step S223 to step S231 explained above is repeated until it is determined in step S229 that the threshold value T is 1 (minimum value), after which this processing ends.

With the embodiment explained above, threshold values are set in order from the maximum value S to the minimum value 1 so that threshold values having a high value are set for positions having a high dot concentration ratio in a combined dot pattern, and first and second dot patterns having high dispersibility.

As in the first embodiment, the coefficients $\delta 1$ and $\delta 2$ that are used in the calculation of the evaluation value V4 in step S225 are such that, depending on the balance of the values thereof, the dispersibility of cyan dots and magenta dots in the low-gradation areas changes. Therefore, preferably these values are suitably adjusted according to how much a granular feeling stands out during single-color printing and mixed-color printing. Particularly, when using an ink color having strong dot power, a granular feeling may be more visually noticeable during single-color printing than during mixed-color printing. In such a case, it can be said that setting the coefficient $\delta 2$ that multiplies the dot concentration ratio of a single-color dot pattern be greater than the coefficient $\delta 1$ that multiplies the dot concentration ratio of a mixed-color dot pattern.

Moreover, it was explained above that when the cyan dither pattern was taken to be the first dither pattern and the magenta dither pattern was taken to be the second dither pattern, threshold values having the same value were assigned for 16 pixels at a time in order in an alternating manner starting from the first dither pattern for cyan, however, of course the embodiment is not limited to this. It is possible to take the magenta dither pattern to be the first dither pattern and the cyan dither pattern to be the second dither pattern, and set threshold values in order starting from the magenta dither pattern. Furthermore, as in the case of the first embodiment, it is possible to change (decrement) the threshold value T after repeating the processing of steps S223 to S228 16 times, without assigning the same threshold value to 16 pixels at the same time.

Above, step S1 in FIG. 5 (generation of a dither pattern for low-gradation areas) was completed after all of the processing of steps S201 to S203 illustrated in FIG. 17 end according to the flowcharts explained in FIGS. 7, 8 and 20. Step S2 in FIG. 5 can be performed by the same processing as in the first embodiment and variation thereof, so an explanation is omitted.

Above, when generating the second dot pattern in step S202 in FIG. 17, the dot concentration ratios of the first dot pattern and second dot pattern were acquired, and the dots for the second dot pattern were placed in the sparsest positions. However, in the case where sufficient dispersibility is obtained in the first dot pattern, for example, it is possible to generate the second dot pattern by sliding that first dot pattern the distance of several pixels in a fixed direction. In any case, as long as the second dot pattern is generated based on the first dot pattern that was generated in a state of high dispersibility, it is possible to obtain the effect of this embodiment.

With the method for generating a dither pattern of this embodiment described above, a dot arrangement having excellent dispersibility is obtained for single cyan color, single magenta color and two colors cyan and magenta in low-gradation areas where it is easy for a granular feeling of the dots to become a problem. More specifically, threshold values are set so that setting each other's threshold values to the same pixels is completely avoided, and the threshold values are set so that there is a set distance or greater between all of the dots. As a result, even when there is a small amount of shifting of the printing position between cyan and magenta during printing, dots that are supposed to be separated do not overlap, and dots that are supposed to overlap are not separated, so it becomes difficult for a displacement of hue due to this to occur.

Third Embodiment

Next, a third embodiment of the present invention will be explained. In this embodiment as well, after the threshold values for the low-gradation areas (1 to S) have been set according to FIG. 5, threshold values for the intermediate-gradation and high-gradation areas (S+1 to 255) are set. The method for generating dot patterns can be the method employed in the first embodiment or can be the method employed in the second embodiment. In this embodiment, when setting threshold values based on the generated dot patterns, the threshold values are set using both dot patterns as the reference dot patterns, instead of a dot pattern that combines cyan dots and magenta dots such as a combined dot pattern or initial dot pattern.

Figure 21B:
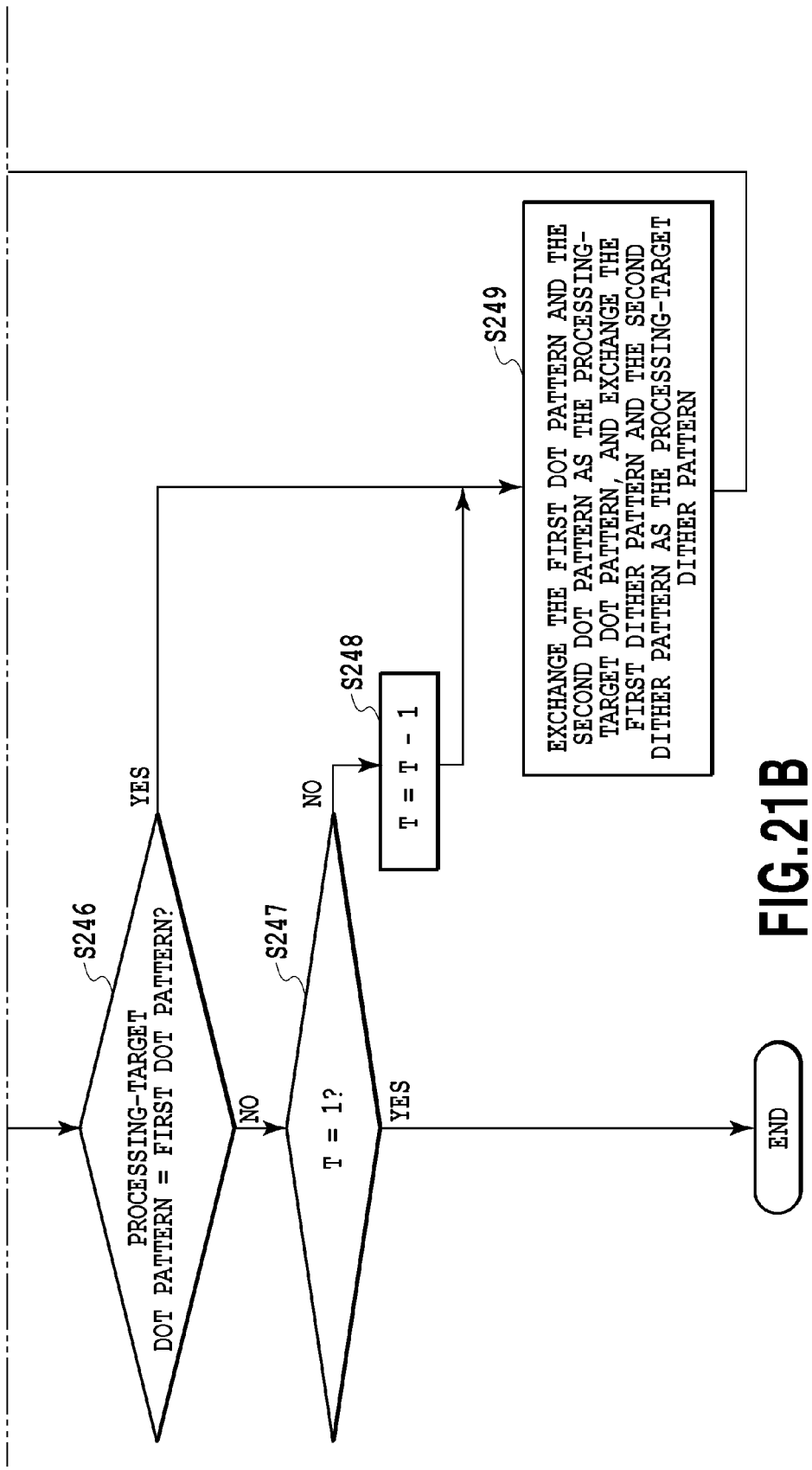
FIG. 21B is a flowchart for explaining a process for setting threshold values in a third embodiment of the present invention.

FIG. 21 is a flowchart for explaining the process for setting threshold values in this embodiment. In the case where first and second dot patterns were generated according to the first embodiment, this processing corresponds to step S03 in FIG. 6. In the case where first and second dot patterns were generated according to the second embodiment, this processing corresponds to step S203 in FIG. 17. In this processing as well, the first dither pattern is taken to be a dither pattern for cyan, and the second dither pattern is taken to be a dither pattern for magenta.

After this processing starts, first, in step S241, the first dot pattern is set as the processing-target dot pattern, the second dot pattern is set as the reference dot pattern, and the first dither pattern is set as the processing-target pattern. Furthermore, a variable threshold value T is set to S (maximum number of dots in the low-gradation areas).

In step S242, the dot concentration ratios are calculated for all of the pixels inside the processing-target dot pattern. In step S243, the dot concentration ratios are calculated for all of the pixels inside the reference dot pattern. The method for calculating the dot concentration ratios can be a method that uses a Gaussian filter, or a method that uses a low-pass filter (LDF) or the like.

In step S244, evaluation values are calculated for all of the pixels from the dot concentration ratios of each of the pixels in the reference dot pattern and dot concentration ratios of each of the pixels in the processing-target dot pattern that were found in steps S242 and S243. Here, when the dot concentration ratio of the reference dot pattern at coordinates (x, y) is taken to be R(x, y), the dot concentration ratio of the processing-target dot pattern is taken to be O(x, y), and the evaluation value is taken to be V5(x, y), V5(x, y) can be expressed by, for example, the following equation.

$$V5(x,y) = \epsilon 1 \times R(x,y) + \epsilon 2 \times O(x,y)$$

Here, $\epsilon 1$ and $\epsilon 2$ are coefficients having positive values. According to the equation above, the larger the evaluation value V5(x, y) is, the higher both the dot concentration ratio in the reference dot pattern and the dot concentration ratio in the processing-target dot pattern become.

In step S245, of the entire pixel area (x, y), 16 pixels (x, y) are extracted in order of the largest evaluation value V5(x, y). The 16 dots that are located in those pixels in the processing-target dot pattern are removed, and the threshold value T is set for those 16 pixels in the processing-target dither pattern.

In step S246, it is determined whether or not the processing-target dot pattern at the current point in time is the first dot pattern. When the processing-target dot pattern is the first dot pattern, processing advances to step S249 and the processing-target dot pattern and reference dither pattern are exchanged, after which, in order to set threshold values for the second dither pattern, processing returns to step S242.

On the other hand, in step S246, when the processing-target dot pattern is not the first dot pattern, but is determined to be the second dot pattern, it is then determined in step S247 whether or not the threshold value T is 1 (minimum value). When the threshold value T is not 1, it is determined that there are still threshold values remaining to be set, so the threshold value T is decremented in step S248, and processing advances to step S249. The processing from step S242 to step S249 explained above is repeated until it is determined in step S247 that the threshold value T is 1 (minimum value), after which this processing ends.

With the embodiment explained above, threshold values are set in order from the maximum value S to the minimum value 1 so that threshold values having a high value are set for positions having high dot concentration ratio in the first and second dot patterns having high dispersibility. Preferably, the coefficients $\epsilon 1$ and $\epsilon 2$ that are used in the calculation of the evaluation value V5 in step S244 are suitably adjusted as in the embodiments described above.

Above it was explained that when the cyan dither pattern is taken to be the first dither pattern, and the magenta dither pattern is taken to be the second dither pattern, threshold values having the same value are assigned in order in an alternating manner for 16 pixels at a time starting from the first dither pattern for cyan, however, needless to say, the embodiment is not limited to this. It is also possible to take the magenta dither pattern to be the first dither pattern, and take the cyan dither pattern to be the second dither pattern, and to set threshold values in order starting from the magenta dither pattern. Moreover, as in the first embodiment, it is also possible to change (decrement) the threshold value T after repeating the processing of steps S242 to S246 16 times, instead of assigning the equivalent threshold values to 16 pixels at the same time.

In this embodiment as well, step S2 in FIG. 5 can be performed by the same processing as in the first embodiment and variation thereof, so an explanation is omitted.

In the embodiments explained above, examples of cyan and magenta dither patterns were explained, however, of course the invention is not limited to such a combination. The way that a granular feeling stands out as was explained in the first embodiment, or the way that a hue displacement stands out as explained in the variation of the first embodiment changes according to the combination of ink, so generating dither patterns for combinations of ink colors for which adverse effects most easily stand out is effective. Particularly, referring to FIG. 12 again, shifting of the printing position when the printing medium 106 is conveyed diagonally is presumed to become larger between the two printing heads 101 and 104 having the largest distance between them of the four printing heads. Therefore, the combination of dither patterns generated should take such a situation into consideration in addition to the combination of ink colors.

When doing this, the number of dither patterns that are generated in a correlation with each other is not limited to two patterns. It is also possible to generate dither patterns for reducing a granular feeling for mixed-color images having three or more colors. For example, in the case of generating three dither patterns, after generating the first dot pattern and second dot pattern using the method described above, a combination of these dot patterns can be taken to be a reference dither pattern, and then as in the second embodiment, a third dot pattern can be generated based on that. When setting threshold values, for example, in steps S40, S231 and S249, processing-target dither patterns can be sequentially set such as first dither pattern→second dither pattern→third dither pattern→first dither pattern . . . and so on.

Furthermore, the case of preparing different dither patterns for different ink colors was explained, however, the present invention is not limited to such a configuration. For example, a problem of optical density variation or a granular feeling due to shift in printing position also exists in the case where plural printing heads eject the same ink color. The present invention functions effectively even by using plural different dither patterns that were generated by the characteristic method described above for these plural printing heads.

Furthermore, in the embodiments explained above, an example of a full-line type printing apparatus was explained using FIG. 1, however, needless to say the present invention is not limited to such a form. The present invention is also effective in the case of a serial type printing apparatus that performs printing scanning for ejecting ink while moving a carriage that is mounted with plural printing heads with respect to a printing medium, and a conveying operation for conveying the printing medium in a direction that is orthogonal to that printing scanning in an alternating manner.

Moreover, in the embodiments above, a form of executing the image processing that is characteristic to the present invention by a printer engine such as illustrated in FIG. 2 was explained, however, the characteristic image processing of the present invention can also be executed by a host apparatus that is connected to a printing apparatus instead of being executed by the printing apparatus. In that case, binary data that is the result of quantization by the host apparatus is transferred to the printing apparatus, and the host apparatus becomes the image processing apparatus of the present invention. In this case, as long as the system executes the series of processes such as described above, both performing the processing by hardware, and performing the processing by software are within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-206321, filed Oct. 1, 2013, which is hereby incorporated by reference herein in its entirety.

What is claimed is:

1. A dither pattern generation method for generating plural dither patterns that include a first dither pattern and a second dither pattern in which threshold values 1 to MAX are arranged, comprising:
   an initial dot pattern generation process of generating an initial dot pattern in which $2 \times S \times N$ (S and N are integers that satisfy $1 \leq S < MAX$, and $1 \leq N$) dots are arranged in a specified dither pattern area so as to have a blue noise characteristic;
   a distributing process of distributing the $2 \times S \times N$ dots that are arranged in the initial dot pattern into a first dot pattern and a second dot pattern so that the first dot pattern and the second dot pattern both have a blue noise characteristic;
   a process of generating the first dither pattern by setting each of threshold values 1 to S for every N pixels that are correlated with the first dot pattern so that threshold values having a high value are set for positions having a high dot concentration ratio in the initial dot pattern and the first dot pattern; and
   a process of generating the second dither pattern by setting each of threshold values 1 to S for every N pixels that are correlated with the second dot pattern so that threshold values having a high value are set for positions having a high dot concentration ratio in the initial dot pattern and the second dot pattern.

2. A dither pattern generation method for generating plural dither patterns that include a first dither pattern and a second dither pattern in which threshold values 1 to MAX are arranged, comprising:
   a first dot pattern generation process of generating a first dot pattern in which $S \times N$ (S and N are integers that satisfy $1 \leq S < MAX$, and $1 \leq N$) dots are arranged in a specified dither pattern area so as to have a blue noise characteristic;
   a second dot pattern generation process of generating a second dot pattern so that a dot pattern that combines the first dot pattern and the second dot pattern and the second dot pattern each have a blue noise characteristic;
   a process of generating the combined dot pattern that combines the first dot pattern and the second dot pattern;
   a first threshold value setting process of setting threshold values for the first dither pattern by setting each of threshold values 1 to S for every N pixels that are correlated with the first dot pattern so that threshold values having a high value are set for positions having a high dot concentration ratio in the combined dot pattern and the first dot pattern; and
   a second threshold value setting process of setting threshold values for the second dither pattern by setting each of threshold values 1 to S for every N pixels that are correlated with the second dot pattern so that threshold values having a high value are set for positions having a high dot concentration ratio in the combined dot pattern and the second dot pattern.

3. A dither pattern generation method for generating plural dither patterns that include a first dither pattern and a second dither pattern in which threshold values 1 to MAX are arranged, comprising:
   a first dot pattern generation process of generating a first dot pattern in which $S \times N$ (S and N are integers that satisfy $1 \leq S < MAX$, and $1 \leq N$) dots are arranged in a specified dither pattern area so as to have a blue noise characteristic;
   a second dot pattern generation process of generating a second dot pattern in which $S \times N$ (S and N are integers that satisfy $1 \leq S < MAX$, and $1 \leq N$) dots are arranged in a specified dither pattern area so as to have a blue noise characteristic, and so that a combination with the first dot pattern has a blue noise characteristic;
   a first threshold value setting process of setting threshold values for the first dither pattern by setting each of threshold values 1 to S for every N pixels that are correlated with the first dot pattern so that threshold values having a high value are set for positions having a high dot concentration ratio in the first dot pattern and the second dot pattern; and
   a second threshold value setting process of setting threshold values for the second dither pattern by setting each of threshold values 1 to S for every N pixels that are correlated with the second dot pattern so that threshold values having a high value are set for positions having a high dot concentration ratio in the first dot pattern and the second dot pattern.

4. The dither pattern generation method according to claim 1, further comprising:
- a third threshold value setting process of setting S+1 or more threshold values for pixels in the first dither pattern, for which threshold values 1 to S were set in the first threshold value setting process, that are correlated with the first dot pattern so that lower threshold values are set for positions having a low dot concentration ratio in the first dot pattern; and
- a fourth threshold value setting process of setting S+1 or more threshold values for pixels in the first dither pattern, for which threshold values 1 to S were set in the second threshold value setting process, that are correlated with the second dot pattern so that lower threshold values are set for positions having a low dot concentration ratio in the second dot pattern.

5. The dither pattern generation method according to claim 1, further comprising:
- a third threshold value setting process of setting S+1 or more threshold values for pixels in the first dither pattern, for which threshold values 1 to S were set in the first threshold value setting process, that are correlated with the first dot pattern so that the number of dots in the second dot pattern that are adjacent to dots of the first dot pattern are nearly uniform among adjacent directions; and
- a fourth threshold value setting process of setting S+1 or more threshold values for pixels in the second dither pattern, for which threshold values 1 to S were set in the second threshold value setting process, that are correlated with the second dot pattern so that the number of dots in the first dot pattern that are adjacent to dots of the second dot pattern are nearly uniform among adjacent directions.

6. The dither pattern generation method according to claim 1, wherein the first dither pattern and the second dither pattern are used for printing material of different colors.

7. The dither pattern generation method according to claim 1, wherein the first dither pattern and the second dither pattern are used for printing material of the same color.

8. The dither pattern generation method according to claim 1, wherein the initial dot pattern generation process and the distribution process use a Gaussian filter or a low-pass filter to generate the dot pattern having the blue noise characteristic.

9. The dither pattern generation method according to claim 2, wherein the first dot pattern generation process and the second dot pattern generation process use a Gaussian filter or a low-pass filter to generate the dot pattern having the blue noise characteristic.

10. The dither pattern generation method according to claim 3, wherein the first dot pattern generation process and the second dot pattern generation process use a Gaussian filter or a low-pass filter to generate the dot pattern having the blue noise characteristic.

11. A dither pattern that was generated according to the dither pattern generation method according to claim 1.

12. An image processing apparatus that performs quantization processing using a dither pattern that was generated according to the dither pattern generation method according to claim 1.

* * * * *